(12) United States Patent
Voice et al.

(10) Patent No.: US 12,030,013 B2
(45) Date of Patent: Jul. 9, 2024

(54) PROCESS FOR CAPTURING CO2 FROM A MOBILE SOURCE USING EXHAUST HEAT

(71) Applicant: SAUDI ARABIAN OIL COMPANY, Dhahran (SA)

(72) Inventors: Alexander Voice, Detroit, MI (US); Austin Wilks, Brighton, MI (US); Esam Zaki Hamad, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 264 days.

(21) Appl. No.: 17/451,936

(22) Filed: Oct. 22, 2021

(65) Prior Publication Data
US 2023/0130504 A1    Apr. 27, 2023

(51) Int. Cl.
*B01D 53/14* (2006.01)
*F01N 3/02* (2006.01)
*F01N 3/08* (2006.01)
*F02M 26/22* (2016.01)

(52) U.S. Cl.
CPC ..... *B01D 53/1425* (2013.01); *B01D 53/1412* (2013.01); *B01D 53/1418* (2013.01); *B01D 53/1475* (2013.01); *B01D 53/1493* (2013.01); *F01N 3/0205* (2013.01); *F01N 3/0857* (2013.01); *F01N 3/0878* (2013.01); *F01N 3/0885* (2013.01); *F02M 26/22* (2016.02); *B01D 2257/504* (2013.01); *F01N 2410/02* (2013.01); *F01N 2410/12* (2013.01); *F01N 2410/14* (2013.01)

(58) Field of Classification Search
CPC ............ B01D 53/1425; B01D 53/1475; B01D 2257/504; F01N 3/0857
See application file for complete search history.

(56) References Cited

U.S. PATENT DOCUMENTS

| | | | |
|---|---|---|---|
| 1,783,901 A | 12/1930 | Bottoms | |
| 6,146,603 A | 11/2000 | Chakravarti et al. | |
| 8,280,646 B2 | 10/2012 | Seidel | |
| 8,703,082 B2 | 4/2014 | Svendsen et al. | |
| 2004/0144251 A1 | 7/2004 | Mitsuda | |

(Continued)

FOREIGN PATENT DOCUMENTS

| | | |
|---|---|---|
| EP | 1 967 249 A1 | 9/2008 |
| EP | 2 551 007 A1 | 1/2013 |

(Continued)

OTHER PUBLICATIONS

Machine translation of KR-20200046228-A accessed Dec. 15, 2023. (Year: 2023).*

(Continued)

*Primary Examiner* — Jonathan R Matthias
(74) *Attorney, Agent, or Firm* — Osha Bergman Watanabe & Burton LLP

(57) ABSTRACT

An exhaust gas carbon dioxide capture and recovery system that may be mounted on a mobile vehicle or vessel. The system may include an exhaust absorber system, a solvent regenerator, a solvent loop, a carbon dioxide compressor, and a carbon dioxide storage tank, among other components. The system may be configured and integrated such that energy in the exhaust may be used to power and drive the carbon dioxide capture while having minimal parasitic effect on the engine.

29 Claims, 9 Drawing Sheets

(56) References Cited

U.S. PATENT DOCUMENTS

| | | |
|---|---|---|
| 2008/0009405 A1 | 1/2008 | Russell |
| 2009/0320682 A1 | 12/2009 | Wagner et al. |
| 2012/0129236 A1 | 5/2012 | Fradette et al. |
| 2013/0052096 A1 | 2/2013 | Konishi et al. |
| 2013/0174739 A1 | 7/2013 | Dvininov et al. |
| 2013/0195742 A1 | 8/2013 | Hamad et al. |
| 2015/0231561 A1 | 8/2015 | Reardon et al. |
| 2017/0197173 A1 | 7/2017 | Yamamoto et al. |
| 2018/0094560 A1 | 4/2018 | Williams et al. |

FOREIGN PATENT DOCUMENTS

| | | |
|---|---|---|
| EP | 2 640 491 A1 | 9/2013 |
| EP | 2 830 737 A2 | 2/2015 |
| EP | 2 665 808 B1 | 12/2016 |
| EP | 2 673 071 B1 | 8/2017 |
| EP | 2 908 928 B1 | 5/2018 |
| EP | 2 830 737 B1 | 10/2019 |
| GB | 2497867 A | 6/2013 |
| JP | 2012-217959 A | 11/2012 |
| KR | 20200046228 A * | 5/2020 |
| WO | 2012/100165 A1 | 7/2012 |
| WO | 2014/065778 A1 | 5/2014 |
| WO | 2015/052325 A1 | 4/2015 |
| WO | 2016/057918 A1 | 4/2016 |
| WO | 2016/205057 A1 | 12/2016 |

OTHER PUBLICATIONS

Sanchez Fernandez, Eva et al., "DECAB: process development of a phase change absorption process"; Energy Procedia; vol. 4; pp. 868-875; 2011 (8 pages).

Ma'Mun, Sholeh et al., "Selection of new absorbents for carbon dioxide capture"; Energy Conversion and Management; vol. 48, Issue 1; pp. 251-258; Jan. 2007 (8 pages).

Feron, Paul H.M. et al., "New Solvents Based on Amino-Acid Salts for CO2 Capture From Flue Gases"; Greenhouse Gas Control Technologies 7; vol. II—Part 1; pp. 1153-1158; 2005 (6 pages).

Brouwer, J.P. et al., "Amino-acid salts for CO2 capture from flue gases"; Proceedings of the Fourth Annual Conference on Carbon Dioxide Capture & Sequestration; May 2-5, 2005 (7 pages).

Simons, Katja et al., "Highly Selective Amino Acid Salt Solutions as Absorption Liquid for CO2 Capture in Gas-Liquid Membrane Contactors"; ChemSusChem; vol. 3, Issue 8; pp. 939-947; Aug. 23, 2010 (9 pages).

Van Holst, Jacco et al., "Physiochemical Properties of Several Aqueous Potassium Amino Acid Salts"; Journal of Chemical & Engineering Data; vol. 53, Issue 6; pp. 1286-1291; May 3, 2008 (6 pages).

Weiland, Ralph H. et al., "Post-combustion CO2 Capture with Amino-Acid Salts"; Proceedings of the GPA Europe Meeting; pp. 1-11; Sep. 22-24, 2010 (11 pages).

Aronu, Ugochukwu E. et al., "Vapor-liquid equilibrium in amino acid salt system: Experiments and modeling"; Chemical Engineering Science; vol. 66, Issue 10; pp. 2191-2198; May 15, 2011 (8 pages).

Guo, Dongfang et al., "Amino Acids as Carbon Capture Solvents: Chemical Kinetics and Mechanism of the Glycine + CO2 Reaction"; Energy & Fuels; vol. 27, Issue 7; pp. 3898-3904; Jun. 4, 2013 (24 pages).

Gupta, Mayuri et al., "Understanding Carbamate Formation Reaction Thermochemistry of Amino Acids as Solvents for Postcombustion CO2 Capture"; The Journal of Physical Chemistry B; vol. 123, Issue 40; pp. 8433-8447; Sep. 12, 2019 (15 pages).

Pessina, Laure-Anne, "Capturing CO2 from trucks and reducing their emissions by 90%"; EPFL; Dec. 23, 2019; <https://actu.epfl.ch/news/capturing-co2-from-trucks-and-reducing-their-emiss/>; Accessed Aug. 6, 2020 (3 pages).

Feenstra, M., et al. "Ship-based carbon capture onboard of diesel or LNG-fuelled ships", International Journal of Greenhouse Gas Control, vol. 85, Jun. 1, 2019, pp. 1-10, XP093010812, 10 pages.

Awoyomi, A. et al., "Process and Economic Evaluation of an Onboard Capture System for LNG-Fueled CO2 Carriers", Industrial & Engineering Chemistry Research, vol. 59, No. 15, Nov. 27, 2019, pp. 6951-6960, XP093010813, 10 pages.

Luo, X., et al., Study of solvent-based carbon capture for cargo ships through process modelling and simulation, Applied Energy, vol. 195, 2017, pp. 402-413, XP029971933, 12 pages.

Tataru-Farmus, R. E., et al., "Carbon Dioxide Absorption Into New Formulated Amine Solution. (I)Solution Viscosity Measuring And Correlation", Research Gate, 2007, pp. 1-8, XP093010829, 8 pages.

Fang, S., et al., "Optimal Sizing of Shipboard Carbon Capture System for Maritime Greenhouse Emission Control", IEEE Transactions on Industry Applications, vol. 55, No. 6, 2019, XP011755144, 11 pages.

García-Mariaca, A., et al., Review on Carbon Capture in ICE Driven Transport, Energies, vol. 14, No. 21, 2021, pp. 6865 (1-30), 30 pages.

Sharma, S., et al., Carbon From Internal Combustion Engine Exhaust Using Temperature Swing Adsorption, Frontiers in Energy Research, vol. 7, 2019, pp. 1-12, XP055968223, 12 pages.

Wu, C., et al., "Proposal and assessment of a combined cooling and power system based on the regenerative supercritical carbon dioxide Brayton cycle integrated with an absorption refrigeration cycle for engine waste heat recovery", Energy Conversion and Management, vol. 207, 2020, pp. 112527 (1-12), 12 pages.

Farzaneh-Gord, M., et al., Heat Recovery From a Natural Gas Powered Internal Combustion Engine By CO2 Transcritical Power Cycle, Thermal Science, vol. 14, No. 4, 2010, pp. 897-911, XP93010798, 16 pages.

International Search Report and the Written Opinion of the International Searching Authority issued Jan. 10, 2023 In corresponding International (PCT) Application No. PCT/US2022/046188, 24 pages.

* cited by examiner

PROCESS FOR CAPTURING CO2 FROM A MOBILE SOURCE USING EXHAUST HEAT

BACKGROUND

Carbon dioxide ($CO_2$) emissions, including from vehicles and other sources, is a contributor to climate change. Reducing $CO_2$ emissions from mobile and other internal combustion engine sources, however, requires technology and engineering that balances operating and fixed costs while avoiding systems and operations that are overly-complex or hinder operation of the mobile source. For example, in the case where a $CO_2$-reduction technology requires an unconventional or uncommon energy source to operate, or requires bulky, heavy, and costly equipment to operate, such a technology may reduce the usefulness of the vehicle by making refueling costlier, less convenient, or a lengthier process.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments herein relate to an exhaust gas carbon dioxide capture and recovery system for an internal combustion engine. The system may include an exhaust absorber system, a solvent regenerator, a carbon dioxide compressor, and a carbon dioxide storage tank, among other components. The exhaust absorber system may be configured to extract at least a portion of carbon dioxide from a first exhaust feed using a lean solvent stream comprising a solvent selective for absorbing carbon dioxide and to produce a first exhaust product having a reduced amount of carbon dioxide and a rich solvent stream comprising solvent and absorbed carbon dioxide. In some embodiments, the exhaust absorber system may operate at a temperature of less than 80° C. The solvent regenerator is configured to convert the rich solvent stream into the lean solvent stream and a crude carbon dioxide vapor, where the solvent regenerator is coupled to the exhaust absorber system using a system solvent loop such that the solvent regenerator is downstream of the exhaust absorber system, on a rich side of the system solvent loop, receiving the rich solvent stream, and upstream of the exhaust absorber system, on a lean side of the system solvent loop, providing the lean solvent stream. In some embodiments, the solvent regenerator may operate at a temperature of greater than 100° C. The carbon dioxide compressor is configured to convert the crude carbon dioxide vapor into a concentrated pressurized carbon dioxide product, where the carbon dioxide compressor is coupled downstream of the solvent regenerator along a carbon dioxide gas flow path. The carbon dioxide storage tank is configured to both receive and store the concentrated pressurized carbon dioxide product, where the carbon dioxide storage tank is coupled downstream of the carbon dioxide compressor along the carbon dioxide gas flow path. The system may be mounted on a mobile vehicle or vessel in some embodiments; in other embodiments, the system may be associated/integrated with an internal combustion engine, such as a generator, receiving exhaust gas from the internal combustion engine.

The system of some embodiments may include a heat exchanger configured to exchange heat between the lean solvent being fed from the solvent regenerator to the exhaust absorber system and the rich solvent being fed from the exhaust absorber system to the solvent regenerator. Further, two or more heat exchangers associated with the solvent regenerator may be configured to transfer heat from respective heat sources into the solvent. The heat provided by the two or more heat exchangers may be used to regenerate the solvent by transferring heat from the heat sources in to the solvent system, raising the temperature of the carbon-dioxide containing solvent and releasing the carbon dioxide from the solvent. The heat sources may include, for example, at least two of the following: (1) engine exhaust going to a tailpipe of the internal combustion engine; (2) engine exhaust being recirculated to the internal combustion engine; (3) engine coolant; or (4) engine lubrication oil.

The system may further include a backpressure device and a pump, wherein at least one of the two or more heat exchangers, in conjunction with a respective backpressure device and pump, is configured to heat and pressurize the solvent above an operating pressure of the stripper, forming a superheated solvent. In some embodiments, the backpressure device comprises a spray nozzle. The pressure drop as the solvent exits the backpressure device and enters the regenerator may cause flash boiling and release of vapors comprising water and carbon dioxide to be released from the solvent.

The solvent regenerator, in some embodiments, is a stripper column containing packing material configured to facilitate mass transfer between gas and liquid phases. The stripper may be configured to receive the rich solvent in an upper portion of the column and to receive solvent from the two or more heat exchangers in a lower portion of the column.

In various embodiments, additional heat sources associated with the internal combustion engine may be configured to heat a solvent stream. The additional heat sources may be used to produce either additional superheated solvent streams that flash boil when introduced to the regenerator or may be used in conjunction with boilers to produce separate liquid and vapor streams from the solvent, where the solvent is fed into the bottom part of the solvent regenerator and the liquid may be returned to the exhaust absorber system.

Embodiments of systems herein may further include a control system configured to maintain a temperature of the solvent below a specific temperature, such as to limit solvent degradation. For example, one or more bypasses around heat exchangers and associated valving may be provided and configured to limit a temperature of the carbon dioxide selective solvent, for example, to limit degradation (reaction/conversion of the solvent) to less than 2 wt % per week, per month, or per year. For example, the control system may be configured to maintain the solvent throughout the system at less than a maximum temperature of, for example, 120° C., 125° C., 130° C., 140° C., or 150° C.

In some embodiments, the internal combustion engine is configured to operate with an engine coolant or engine lubricant having a temperature of at least 120° C. In such embodiments, the engine coolant may be suitable to provide heat to the solvent at a suitable temperature for solvent regeneration.

In embodiments of the system, a first of the two or more heat exchangers is configured to exchange heat between solvent and engine exhaust going to a tailpipe and a second of the two or more heat exchangers is configured to exchange heat between solvent and engine exhaust being recirculated to an intake of the internal combustion engine.

The system of some embodiments may further include an exhaust gas to rich solvent heat exchanger configured to receive the first exhaust feed, transfer heat from the first exhaust feed into the rich solvent, and pass the first exhaust feed to the exhaust absorber system along an exhaust gas flow path, where the exhaust gas to rich solvent heat exchanger is coupled upstream of the exhaust absorber system along the exhaust gas flow path, upstream of the solvent regenerator and downstream of the exhaust absorber system.

The system of some embodiments may further include an exhaust gas heat exchanger configured to reduce a temperature of the first exhaust feed, wherein the exhaust gas heat exchanger is coupled downstream of the exhaust gas to rich solvent feed and upstream of the exhaust absorber system along the exhaust gas flow path.

Yet other embodiments may include a secondary heat transfer loop containing a fluid which is thermally stable to exhaust temperatures and configured to extract heat from a high temperature heat source using a first heat exchange device, and then to transfer the extracted heat from the fluid to the solvent using a second heat exchange device or boiler. This fluid may be an organic carbon-based oil, a silicone-based oil, a glycol-based fluid, or other thermally stable fluid. Desirable characteristics of the fluid are thermal stability to 200 to 500° C. (exhaust temperature dependent), have a low vapor pressure, and have a low viscosity. For example, the first heat exchange device may include an exhaust gas to heat exchange fluid heat exchanger and wherein the second heat exchange device comprises a heat exchange fluid to rich solvent heat exchanger. The exhaust gas to heat exchange fluid heat exchanger is configured to receive the first exhaust feed, transfer heat from the first exhaust feed into the heat exchange fluid, and pass the first exhaust feed to the exhaust absorber system along an exhaust gas flow path. As used herein, terms such as "heat exchange fluid," "heat exchange medium," "heat transfer liquid" and the like may be used interchangeably. The heat exchange fluid to rich solvent heat exchanger is configured to receive heated fluid from the exhaust gas to heat exchange fluid heat exchanger, indirectly heat the rich solvent, and pass heated rich solvent to the solvent regenerator. The exhaust gas to heat exchange fluid heat exchanger and heat exchange fluid to rich solvent heat exchanger are respectively coupled upstream of the exhaust absorber system along the exhaust gas flow path, and upstream of the solvent regenerator and downstream of the exhaust absorber system. In some embodiments, the system may further include an exhaust gas heat exchanger configured to reduce a temperature of the first exhaust feed, wherein the exhaust gas heat exchanger is coupled downstream of the exhaust gas to heat exchange fluid heat exchanger and upstream of the exhaust absorber system along the exhaust gas flow path. In some embodiments, one or more steam boilers may be used to boil water, where the water feed to the boiler is provided by water collected when the crude carbon dioxide leaving the regenerator is cooled and compressed, and where the steam produced by the boiler is fed to the stripper to provide the heat for solvent regeneration.

The system of some embodiments may further include a solvent-to-solvent heat exchanger configured to transfer heat from the lean solvent into the rich solvent, where the solvent-to-solvent heat exchanger is coupled downstream of the exhaust absorber system and upstream of the solvent regenerator with respect to rich solvent flow (along the rich side of the system solvent loop), and is coupled downstream of the solvent regenerator and upstream of the exhaust absorber system with respect to lean solvent flow (along the lean side of the system solvent loop). In some embodiments, the system may further include a lean solvent heat exchanger configured to reduce a temperature of the lean solvent, wherein the lean solvent heat exchanger is coupled downstream of the solvent-to-solvent heat exchanger and upstream of the exhaust absorber system with respect to the lean solvent flow.

The system of some embodiments may further include an exhaust to regenerator lean solvent heat exchanger configured to receive a second exhaust feed and to pass a second exhaust product, and to transfer heat from the exhaust into a second lean solvent.

The system of some embodiments may further include an exhaust to heat exchange medium heat exchanger and a heat exchange medium to regenerator lean solvent heat exchanger, configured to receive a second exhaust feed and to pass a second exhaust product, and to transfer heat from the exhaust via the heat exchange medium into a second lean system solvent.

Yet other embodiments of the system may include a bypass system configured for diverting exhaust around the exhaust absorber system. Still further embodiments of the system may include a control system configured for one or more of maintaining a water content of the lean solvent, maintaining a flow rate of the lean solvent, controlling a temperature or pressure of the regenerator, controlling a temperature of the exhaust gas, or controlling a temperature or pressure of the rich solvent or the lean solvent. Control strategies contemplated include varying a flow rate of the solvent or heat source through a heat exchanger, and/or varying a flow rate of solvent or heat source through a bypass around a heat exchanger, or around a gas liquid contactor. In some embodiments, the control system is configured for one or more of: maintaining exhaust backpressure on the internal combustion engine below a certain limit; maintaining a temperature of the first exhaust feed entering the exhaust absorber system below a certain limit; maintaining a water content of the lean solvent stream; maintaining a flow rate of the lean solvent stream, controlling a temperature or a pressure of the solvent regenerator; or, controlling a temperature of the rich solvent stream or the lean solvent stream. In various embodiments, the control system is configured to activate a bypass valve to direct exhaust flow around the exhaust absorber system when an exhaust temperature limit or an exhaust backpressure limit is exceeded. In some embodiments, the control system is configured to increase a flow rate of rich solvent or lean solvent through a heat exchanger to reduce a temperature of the rich solvent or the lean solvent, or wherein the control system is configured to reduce a flow rate of a heat source fluid through a heat exchanger to reduce the temperature of the rich solvent or the lean solvent. In some embodiments, the control system is configured to adjust a position of a pressure regulator to control a pressure of the solvent regenerator and lean solvent loading, or to reduce a temperature of the solvent regenerator. In yet other embodiments, the system may further include an instrument to measure a solvent viscosity, and the control system is configured to control an amount of water returned to the system based on the measured solvent viscosity.

In another aspect, embodiments herein relate to a process for recovering carbon dioxide from exhaust from an internal combustion engine using an exhaust gas carbon dioxide capture and recovery system mounted on a mobile vehicle or vessel. The process may include introducing a first exhaust feed into the system and introducing a second exhaust feed into the system. The process may include operating the system such that carbon dioxide is extracted from the first exhaust feed and absorbed into a lean system solvent using an exhaust absorber system, forming both a rich system solvent and a first exhaust product; operating the system such that heat is transferred from the lean system solvent into the rich system solvent using a solvent-to-solvent heat exchanger; and operating the system such that heat is transferred from the first exhaust feed into the rich system solvent using an exhaust gas to rich solvent heat exchanger, forming a superheated rich system solvent. The process may also include operating the system such that heat is transferred from the second exhaust feed into a second lean system solvent using an exhaust gas to regenerator lean solvent heat exchanger; operating the system such that carbon dioxide is desorbed from the second lean system solvent and the rich system solvent using a solvent regenerator, forming a crude carbon dioxide and the lean system solvent; and operating the system such that the crude carbon dioxide is compressed using the carbon dioxide compressor, forming a concentrated pressurized carbon dioxide product. The concentrated pressurized carbon dioxide product may be passed into a carbon dioxide storage tank mounted on a mobile vehicle or vessel, the first exhaust product may be passed from the system, where the first exhaust product has a reduced temperature and reduced carbon dioxide concentration as compared to the first exhaust feed, and the second exhaust product may also be passed from the system, where the second exhaust product has a reduced temperature as compared to the second exhaust feed.

The process of embodiments may further include operating the system such that the lean system solvent circulates along a lean side of a system solvent loop from the solvent regenerator, through the solvent-to-solvent heat exchanger, and into the exhaust absorber system, and such that the rich system solvent circulates along a rich side of the system solvent loop from the exhaust absorber system, through the solvent-to-solvent heat exchanger, through the exhaust gas to rich solvent heat exchanger, and into the solvent regenerator.

Embodiments of the process may also include operating the system such that the second lean system solvent circulates along a lean system solvent regenerator reboiler loop from the solvent regenerator, through the exhaust gas to regenerator lean solvent heat exchanger, and back into the solvent regenerator.

The process may produce a first exhaust feed and a second exhaust feed from a combustion engine mounted on the mobile vehicle or vessel. In some embodiments, the first exhaust feed has a greater heat content than the second exhaust feed. Typically the recirculated exhaust gas (EGR) exhaust stream has a higher temperature, but lower flow rate, than the exhaust going to the tailpipe. This means that, despite the higher temperature, the EGR stream has less ability to deliver heat to the system. In various embodiments the second exhaust product is passed into a combustion engine on the mobile vehicle or vessel as part of an exhaust gas recirculation loop.

In yet another aspect, embodiments herein are directed toward a process for reducing carbon dioxide emissions from an internal combustion engine. The process may include, using an exhaust absorber system, extracting at least a portion of carbon dioxide from a first exhaust feed using a lean $CO_2$-selective system solvent and to pass a first exhaust product and a rich system solvent a solvent stream with increased $CO_2$ concentration, wherein the exhaust absorber system operates at a temperature of less than 80° C.

In a solvent regenerator, the rich system solvent may be converted into the lean $CO_2$-selective system solvent and a crude carbon dioxide vapor, where the solvent regenerator is coupled to the exhaust absorber system using a system solvent loop such that the solvent regenerator is downstream of the exhaust absorber system on a rich side of the system solvent loop and upstream of the exhaust absorber system on a lean side of the system solvent loop, and wherein the solvent regenerator operates at a temperature of greater than 100° C. The process may also include: exchanging heat between the lean solvent leaving the solvent regenerator and the rich solvent leaving the absorber system; regenerating the solvent by transferring heat from two or more heat sources into the solvent, thereby raising a temperature and pressure of the solvent, and releasing $CO_2$ from the solvent; and converting the crude carbon dioxide vapor into a concentrated pressurized carbon dioxide product using a carbon dioxide compressor, wherein the carbon dioxide compressor is coupled downstream of the solvent regenerator along a carbon dioxide gas flow path. The pressurized carbon dioxide product may be stored in a carbon dioxide storage tank.

Embodiments of the process may include supplying energy to the carbon dioxide compressor via one or more of a mechanical coupling to the engine crank shaft, a shaft of a turbo compounding device that generates mechanical work from exhaust pressure, a hydraulic motor, or an electrical motor powered by a battery of the internal combustion engine. In some embodiments, a temperature of the exhaust may be reduced to less than 80° C. upstream of the exhaust absorber system. Embodiments may also include reducing a temperature of the solvent to less than 80° C. upstream of the exhaust absorber system. Reducing a temperature of the solvent may include transferring heat from the solvent to a liquid heat transfer fluid and subsequently transferring heat from the liquid heat transfer fluid to the environment.

Other aspects and advantages of this disclosure will be apparent from the following description made with reference to the accompanying drawings and the appended claims.

BRIEF DESCRIPTION OF DRAWINGS

Certain embodiments of the disclosure will be described with reference to the accompanying drawings, where like reference numerals denote like elements. It should be understood, however, that the accompanying figures illustrate the various implementations described and are not meant to limit the scope of various technologies described.

Figure 1:
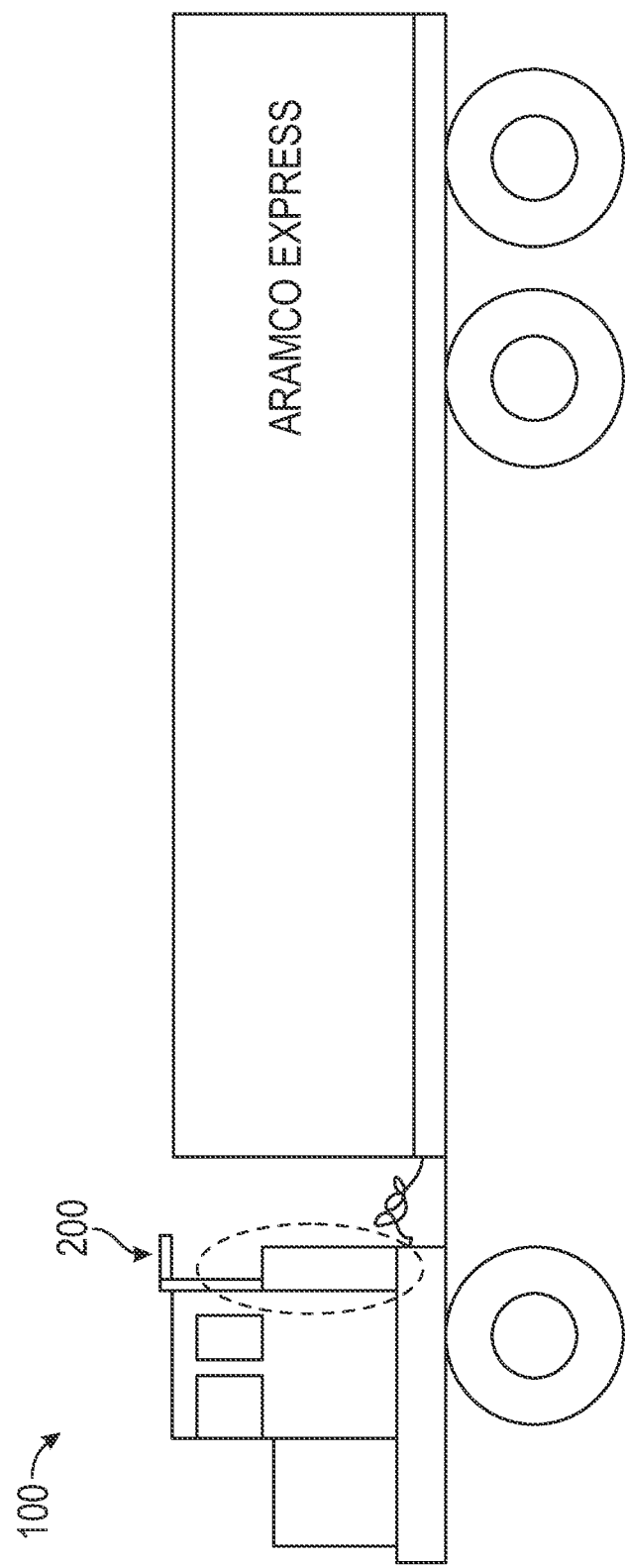
FIG. 1 shows a mobile vehicle with a mounted exhaust gas carbon dioxide capture and recovery system, as provided in one or more embodiments.

In the figures, down are toward or at the bottom and up are toward or at the top of the figure. "Up" and "down" are generally oriented relative to a local vertical direction. However, "upstream" may more generally refer to objects, units or processes taken before a particular unit or process.

As well, "downstream" may more generally refer to objects, units or processes taken after a particular unit or process.

DETAILED DESCRIPTION

Current carbon dioxide capture systems for onboard $CO_2$ capture do not have a high $CO_2$ capture rate, achieving capture of up to about 25% of the generated carbon dioxide from the exhaust. Such systems often fail to fully exploit the full range of carbon dioxide absorption and regeneration capability of solutions. As well, such systems may also have a significant parasitic load on a vehicle. "Parasitic load" in this instance is where a system requires additional energy from the engine, such as power, in order to operate, where the energy could have otherwise been used to create energy for other engine systems or have been converted into motion. Additionally, systems configured for mobile point sources tend to lack complete heat integration. Without such integration, the achievable capture rate of the system is limited.

Exhaust gas carbon dioxide capture and recovery systems and processes of use according to embodiments herein address these issues by using existing fuel and powertrain infrastructure while reducing $CO_2$ emissions. In such systems and processes, there is minimal energy penalty because integrated heating and power systems are used to effectively recover carbon dioxide and to retain and transfer heat within the system. Systems and processes herein may provide greater than 40% carbon dioxide capture with little or no parasitic load on the engine.

Several features may contribute to the exhaust gas carbon dioxide capture and recovery systems and their associated processes of use that are effective in reducing the concentration of carbon dioxide from an exhaust stream of a mobile vehicle or vessel without draining the vehicle or vessel of power. The use of waste exhaust heat—heat that would have been expelled into the environment and lost—as a source of energy has been found to be useful to desorb carbon dioxide from the system solvent. Another feature is the use of a turbo compounding machine from a mobile vehicle or vessel to provide work—mechanical, electrical, hydraulic, or some other form—to power the carbon dioxide compressor and other components of the systems and processes herein. Another feature is superheating the system solvent—heating the system solvent to a temperature and pressure greater than the operating pressure of the stripper. Heating the system solvent to a temperature that produces a vapor pressure greater than the operating pressure of the stripper permits substantial recovery of exhaust enthalpy without causing any flashing in the process lines. Furthermore, it allows waste heat to be transferred from the heat source in a relatively compact device since both of the fluids are in the liquid phase. As well, producing an atomizing spray in the solvent regenerator creates a large amount of interfacial area and aids in separating the gas from the liquid in the rich system solvent and reversing the carbon dioxide-solvent reaction in the solvent regenerator.

Greater solvent regeneration temperatures and pressures may reduce the amount of water reflux and overall energy requirements of the system, including the power requirement for compressors. Additionally, the combination of greater operating pressures and temperatures, and the use of a system solvent that is configured for carbon dioxide absorption and desorption at such operating pressures and temperatures, permits the configuration of systems that are capable of being powered by the waste energy of, being mounted upon, and retaining the captured carbon dioxide from the exhaust stream of a mobile vehicle or vessel until the captured carbon dioxide can be safely and effectively removed from the vehicle or vessel.

FIG. 1 is an example of a system according to embodiments herein as part of a mobile, self-propelled vehicle. FIG. 1 shows a mobile vehicle with a permanently-mounted exhaust gas carbon dioxide capture and recovery system. Semi-truck 100 is a type of mobile, self-propelled vehicle that emits carbon dioxide through an exhaust stream that may be treated by embodiment exhaust gas carbon dioxide capture and recovery systems herein. Examples of such mobile vehicles or vessels include, but are not limited to, cars, trucks, ships, and airplanes. In FIG. 1, semi-truck 100 is shown with an embodiment exhaust gas carbon dioxide capture and recovery system 200 mounted to the rear portion of semi-truck 100. Semi-truck 100 is representative of a type of mobile, self-propelled vehicle, in this case being a class 8 truck towing a semi-trailer. While described herein with respect to use with mobile on-road sources, embodiments herein may also be useful for capturing $CO_2$ from off-road sources as well as stationary sources, such as generators. These machines all emit $CO_2$, have relatively high-quality waste heat that can be used for solvent regeneration, and may produce rotating shaft work that can be used. For example, generator sets, locomotives, and agricultural and construction equipment that may be powered by internal combustion engines may also benefit from embodiments herein.

Mobile vehicles with an exhaust gas carbon dioxide capture and recovery system as described herein are not limited to vehicles or vessels that are self-propelled. Embodiment exhaust gas carbon dioxide capture and recovery systems herein may also be mounted on mobile yet non-self-propelled vehicles and vessels, such as a towed barge, a land- or water-borne skiff, or a land- or water-borne drilling platform or "rig". The mobile unit is configured to be moved and to supply an exhaust stream to the embodiment exhaust gas carbon dioxide capture and recovery system for concentrated pressurized carbon dioxide recovery.

Table 1 shows a summary of various heat sources potentially available for $CO_2$ capture from a typical heavy-duty engine used in a Class 8 semi-truck operating and a mid-speed and mid-load condition. Values listed are nominal values only and may differ for different engines, applications, operating conditions, etc. Although a substantial flow of heat is available from the engine coolant, the typical engine coolant temperature of about 100° C. is too low to provide useful heat for solvent regeneration at 100-135° C. Thus incorporation of multiple heat sources into the solvent regeneration process can increase the amount of $CO_2$ that can be removed from the exhaust gas without penalty to the engine.

In theory the engine could be operated with higher coolant temperature to make some heat available for solvent regeneration from these streams.

TABLE 1

| | Temperature In to Heat Recovery Unit (° C.) | Temperature Out of Heat Recovery Unit (° C.) | Flow Rate (kg/min) | Temperature Difference (° C.) |
| --- | --- | --- | --- | --- |
| Engine exhaust to tailpipe | 310 | 1352 | 15.0 | 175 |
| Engine exhaust recirculated | 460 | 1352 | 4.5 | 325 |

TABLE 1-continued

| | Temperature In to Heat Recovery Unit (° C.) | Temperature Out of Heat Recovery Unit (° C.) | Flow Rate (kg/min) | Temperature Difference (° C.) |
|---|---|---|---|---|
| Engine coolant | 135 | 1253 | 356 | 10 |
| Engine lubrication oil | 135 | 1254 | 86.5 | 10 |

TABLE 1.2

| | Nom. Heat Capacity (KJ/kg/K) | Energy Available (kW) | $CO_2$[1] (kg/min) | % of total |
|---|---|---|---|---|
| Engine exhaust to tailpipe | 1.05 | 45.9 | 0.79 | 39% |
| Engine exhaust recirculated | 1.05 | 25.6 | 0.44 | 22% |
| Engine coolant | 2.1 | 124.6 | 2.14 | 107% |
| Engine lubrication oil | 2.6 | 37.5 | 0.64 | 32% |

[1] Amount of $CO_2$ which can be captured if all of the available heat is applied to the solvent regenerator, which requires an estimated 3.5 MJ of heat per kg $CO_2$ released.
[2] To provide sufficient driving force for heat transfer for a regenerator operating at nominal temperature of 120° C.
[3] Illustrative only, typical engine coolant temperatures leaving the engine are 90-100° C., too low for solvent regeneration.
[4] Illustrative only, typical lubricant oil temperatures are about 120° C., slightly too low for solvent regeneration with reasonable driving force heat transfer.

Figure 2:
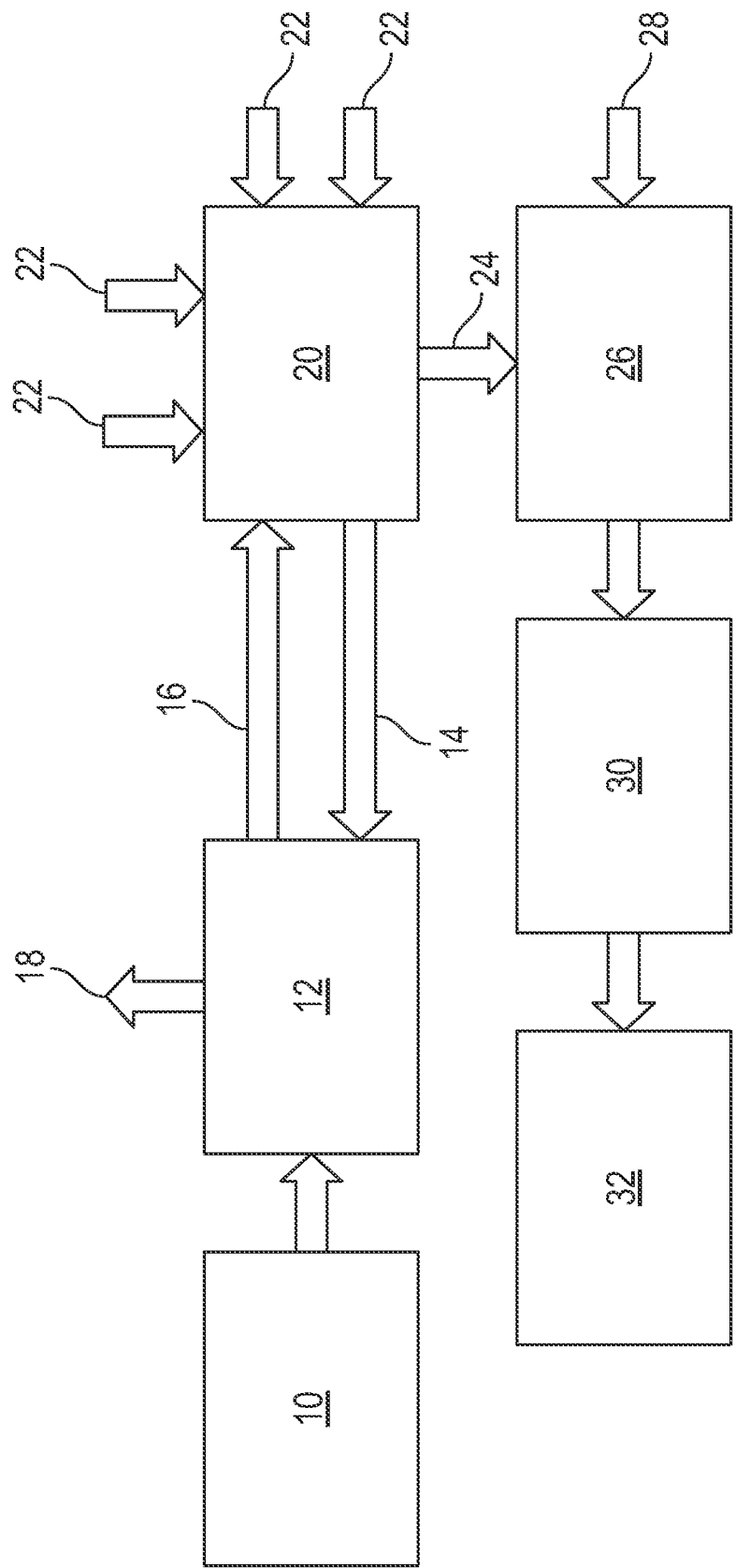
FIG. 2 illustrates a flow diagram of an exhaust gas carbon dioxide capture and recovery system, as provided in one or more embodiments.

FIG. 2 illustrates a simplified flow diagram of an exhaust gas carbon dioxide capture and recovery system according to one or more embodiments herein. In general, FIG. 2 shows a diagram of the major stages of an exhaust gas carbon dioxide capture system, for use with an internal combustion engine, according to embodiments herein. A carbon dioxide containing stream 10, such as an engine exhaust or a portion thereof, is provided to a carbon dioxide absorption stage 12. Within the absorption stage 12, the exhaust is contacted with a lean solvent 14, described further below, the lean solvent absorbing carbon dioxide within the absorption stage, forming a rich solvent 16 and an exhaust 18 having a reduced carbon dioxide content as compared to the feed exhaust 10. As used herein, lean solvent refers to a solvent having a diminished carbon dioxide content, suitable for absorbing carbon dioxide from an exhaust gas, while a rich solvent refers to a solvent having an enhanced carbon dioxide content following absorption of the carbon dioxide from the exhaust gas.

The resulting rich solvent 16 may then be processed in a desorption stage 20 to separate the carbon dioxide from the solvent. In desorption stage 20, the rich solvent may be contacted, directly and/or indirectly, with one or more heat sources 22, to reduce the capacity of the solvent for retaining carbon dioxide, thereby producing a carbon dioxide vapor stream 24 and a lean solvent stream 14, which may be fed for continued use in absorption stage 12.

The carbon dioxide gas recovered from the desorption stage 20 may then undergo densification 26. Densification may include compression and/or cooling of the carbon dioxide, for example. Power 28 for the compression of the carbon dioxide may be provided, for example, from the engine or a turbo-compounding device. Following densification, the carbon dioxide may be transported 30 to an on-board storage system for later carbon dioxide utilization and/or disposal 32.

The direct and/or indirect heating of the solvent to desorb the carbon dioxide (as illustrated with the generic heat inputs 22 of FIG. 2) and any desired or required cooling of the solvent 14 prior to the absorption step 12 may be conducted in various manners. When used with a mobile exhaust source, such as with an engine of a motorized vehicle, the heating sources and cooling sources may be limited and may be appropriately selected to result in the desired heating and cooling of the solvent streams.

Figure 3A:
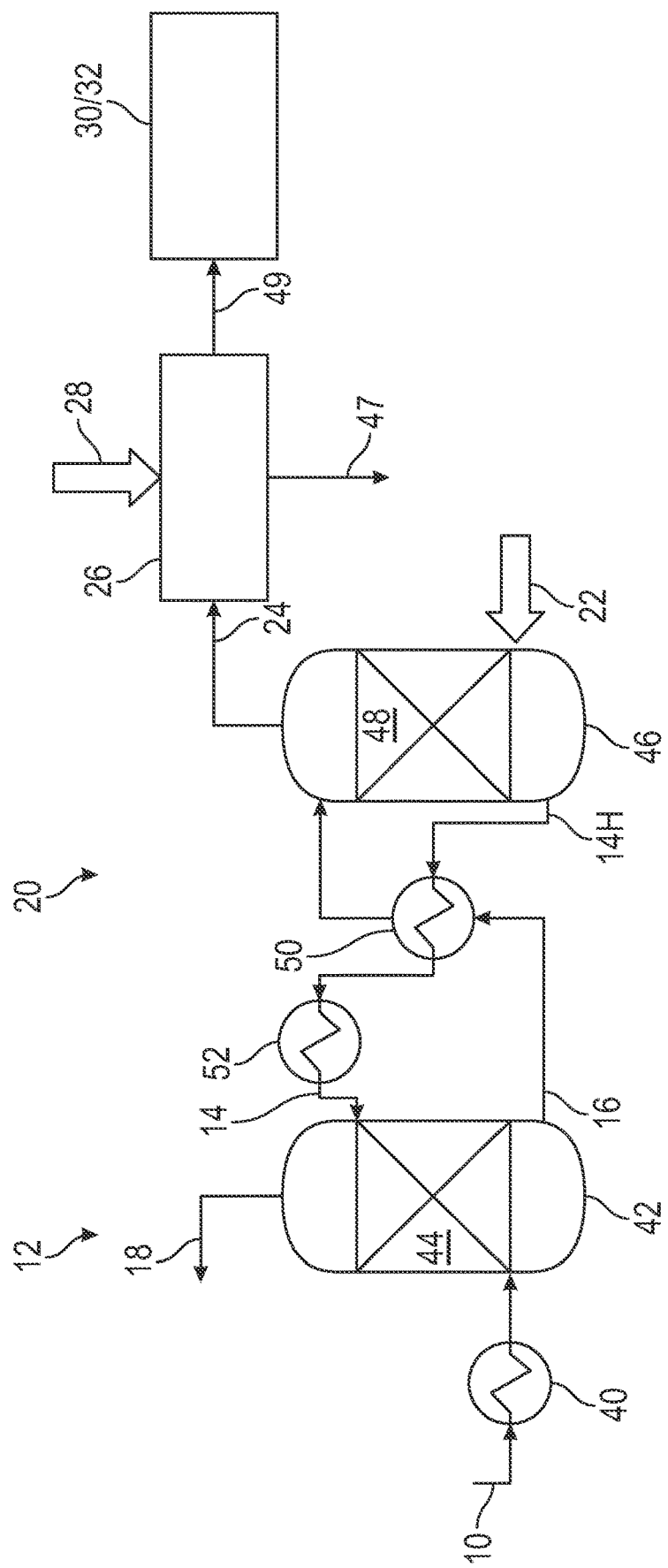
FIGS. 3A-3G are simplified flow diagrams of exhaust gas carbon dioxide capture and recovery systems, as provided in one or more embodiments.

FIG. 3A illustrates one possible manner of integrating heating and cooling of the absorption and desorption stages. FIGS. 3B-3G present other various alternatives envisioned for the desorption stage, each of which may be used to capture carbon dioxide from an exhaust stream, such as an exhaust stream from an engine for a semi-truck 100 (FIG. 1). It is noted that FIG. 3A is generic with respect to the heat source, and FIGS. 3B-3F are various ways of providing the heat input as shown in FIG. 3A. FIG. 3G shows further detail that may apply to one or more of FIGS. 3B-3E. Further, it is noted that FIG. 3G shows superheated lean and rich streams, but some of FIGS. 3B-3E have only a lean or rich superheated stream. FIGS. 3A-3G are described further below.

Referring now to FIG. 3A, a simplified process flow diagram of the absorption and desorption steps 12, 20 (FIG. 2) according to some embodiments herein is illustrated, where like numerals represent like parts. FIG. 3 provides additional details of the carbon dioxide absorption and solvent regeneration stages. Carbon dioxide containing exhaust gases 10 may be cooled using a heat exchanger 40 and fed to an absorber 42, which may contain a bed of contact structures providing a tortuous path for contact and interaction of the exhaust gases with a lean solvent 14 for conducting adsorption step 12 (FIG. 2). Following absorption of at least a portion of the carbon dioxide, the exhaust gases having a reduced carbon dioxide content may be recovered from the absorber 42 via flow line 18. Lean solvent 14 may be fed to the absorber 42 above the contact structure 44 and rich solvent 16 may be recovered from a bottom of the absorber 42. The rich solvent 16 may then be forwarded to a stripper 46 for conducting the desorption step 20.

In stripper 46, the rich solvent may be heated to diminish its capacity for retaining carbon dioxide in a dissolved state. Stripper 46 may also contain a bed of contact structures 48 providing for contact of hot vapors with the rich solvent, aiding in the removal of carbon dioxide from the solvent. Heat input(s) 22 may be provided from various sources, such as from exhaust gases, electrical power generated by the engine, or other heat sources available from the engine. The heat input may strip carbon dioxide from the solvent, allowing recovery of a carbon dioxide vapor stream 24 from a top of the stripper and recovery of a hot lean solvent 14H from a bottom of the stripper. The carbon dioxide recovered from the stripper 46 may undergo downstream processing as noted above, including compression/liquefaction step 26 and storage 30, among others. During compression and liquefaction step 26, water, evaporated solvent, or other normally liquid components recovered with the crude carbon dioxide stream 24 and recovered from the stripper overhead vapor stream 24 may be separated from the carbon dioxide, producing a (water, solvent) liquid stream 47 and a carbon dioxide product stream 49. The water/solvent may recovered in stream 47 may then be returned to stripper 46. Where stream 47 is essentially water, excess water that may be absorbed from the exhaust gases may be discharged so as to dilute the solvent being recycled to the absorber.

Due to the heat addition to the solvent during stripping, the solvent 14H recovered from the stripper has an elevated temperature and thus has a diminished capacity for retaining carbon dioxide. A feed/effluent exchanger may be used to cool the hot lean solvent 14H while warming (pre-heating) the rich solvent 16 being fed from the absorber 42 to the stripper 46. Further cooling may be provided, if necessary, via one or more additional heat exchangers 52 to provide a lean solvent 14 having sufficient capacity for absorbing carbon dioxide.

As described with FIG. 3A, one heat source 22 that may be used to increase a temperature of the rich solvent may include lean solvent being fed from the stripper to the absorber. Other possible heat sources may include engine gas recycle (EGR), exhaust gas prior to discharge to the atmosphere, a heat exchange loop (which may contain a heat exchange fluid providing for transportation of heat from exhaust, as exhaust at a high temperature may be unsuitable for long-term use with the solvent), electrical power provided by the engine, or other heat sources as may be available from the engine or on-board the vehicle. In FIGS. 3B-3G, the heat sources are referred to generically ("first heat source", "second heat source," etc.), and it should be understood that the needed heat may be provided from any one or more of these sources having sufficient energy to provide the desired heating.

Figure 3B:
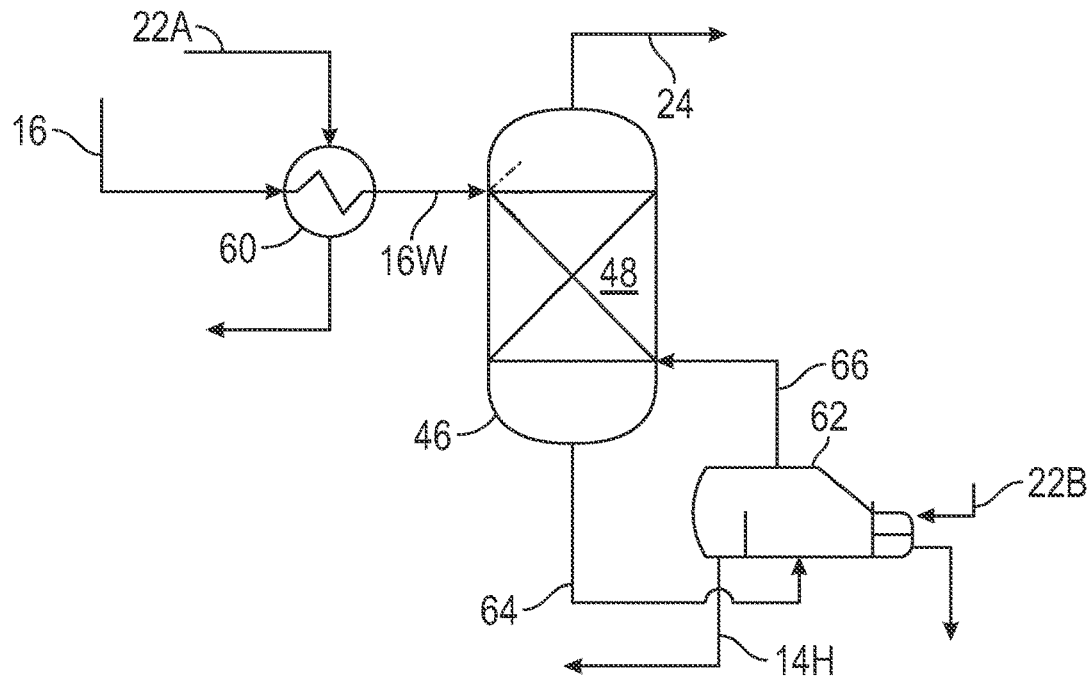

Referring now to FIG. 3B, a simplified process flow diagram of the desorption stage is illustrated. Similar to the desorption step in FIG. 3A, the desorption may be conducted within a stripper 46 containing a bed of contact structure 48. Upstream of the stripper 46, the rich solvent 16 may be pre-heated in a heat exchanger 60 using a first heat source 22A, providing a warmed rich solvent 16W fed to the stripper 46. Additional heat may be provided to the solvent using a kettle type reboiler 62. A kettle type reboiler may be used to provide heat from a second heat source 22B to heat the lean solvent stripper bottoms 64 and provide reboil vapors 66 to the stripper (solvent regenerator) 46. Lean solvent 64 exits the bottom of the stripper 46, flows into the reboiler 62, where it indirectly contacts the second heat source 22B, and then spills over a weir before exiting from the bottom of the reboiler unit 62 as hot lean solvent stream 14H. Meanwhile vapor, primarily in the form of steam but also containing some carbon dioxide, exits from the top of the reboiler 62 via flow line 66 and is passed to the solvent regenerator (stripper column) 46. The steam rises through the contact structure 48 and contacts the rich solvent entering from the top. The steam condenses as it rises up and the heat of condensation heats the rich solvent, releasing carbon dioxide.

Figure 3C:
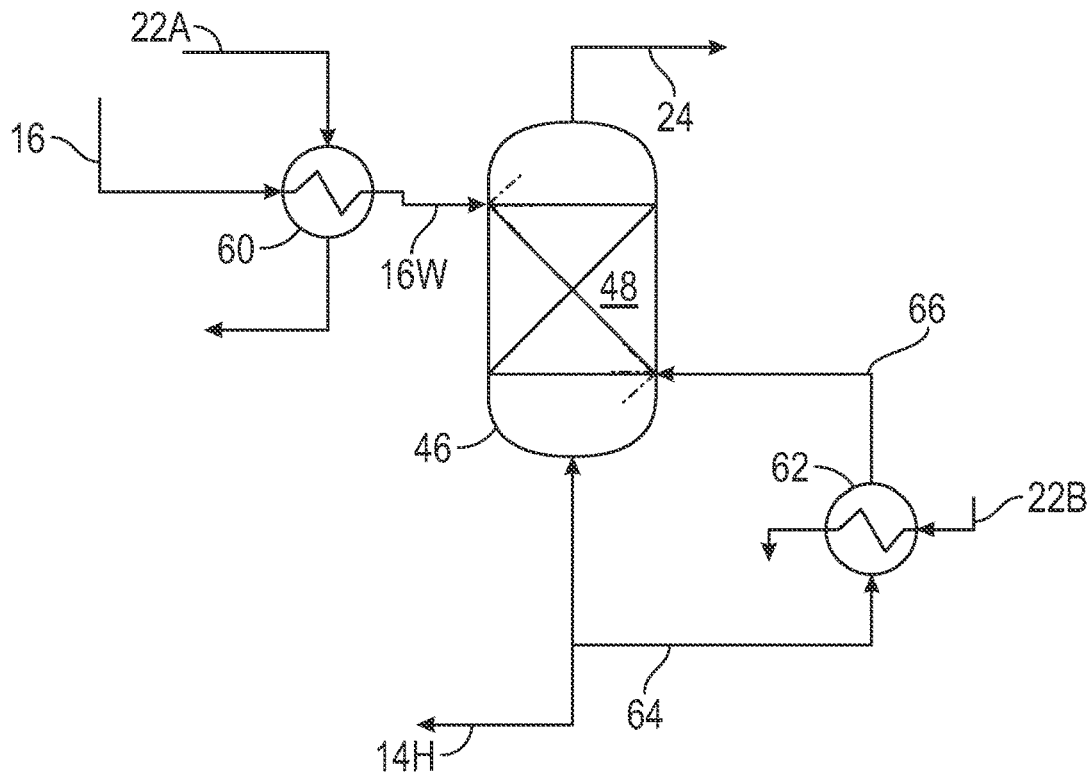

FIG. 3C provides a similar configuration having a reboiler associated with the stripper. In such alternative embodiments, shell and tube or plate and frame style reboilers 70 can also be used to transfer heat from a second heat source to the reboiled lean solvent bottoms stream 64 recovered from the stripper.

Figure 3D:
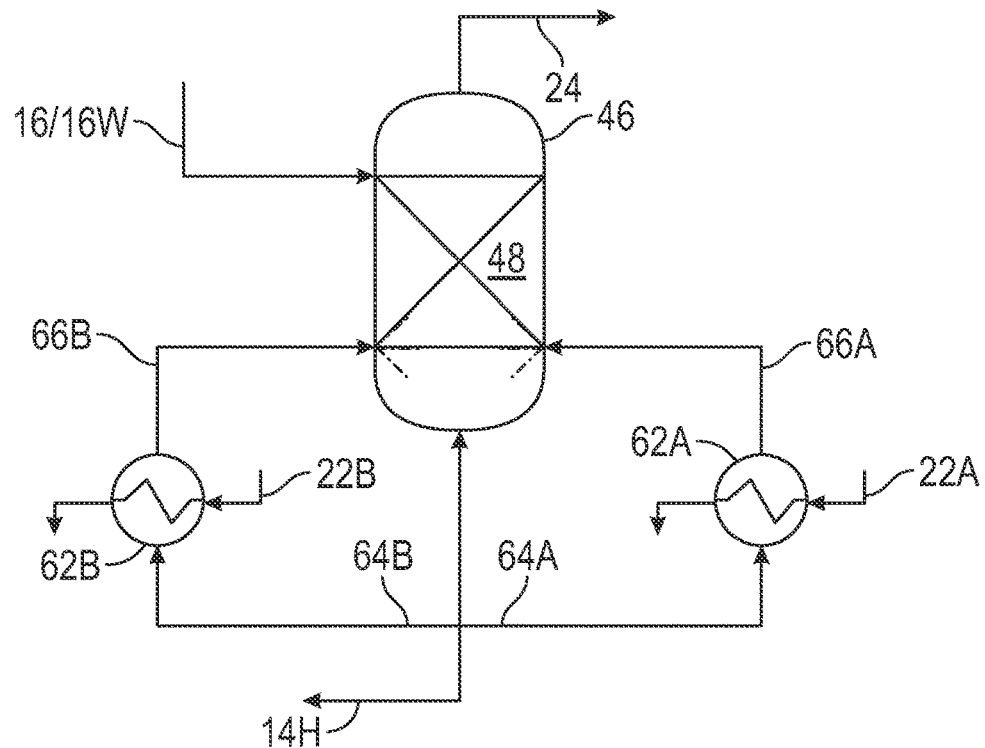

As illustrated in FIG. 3D, in various other embodiments, multiple reboilers 62 (62A, 62B, etc.) may be used to heat the stripper column 46 bottoms stream 64 (64A, 64B, etc.) using heat from multiple sources (22A, 22B, etc.).

Figure 3E:
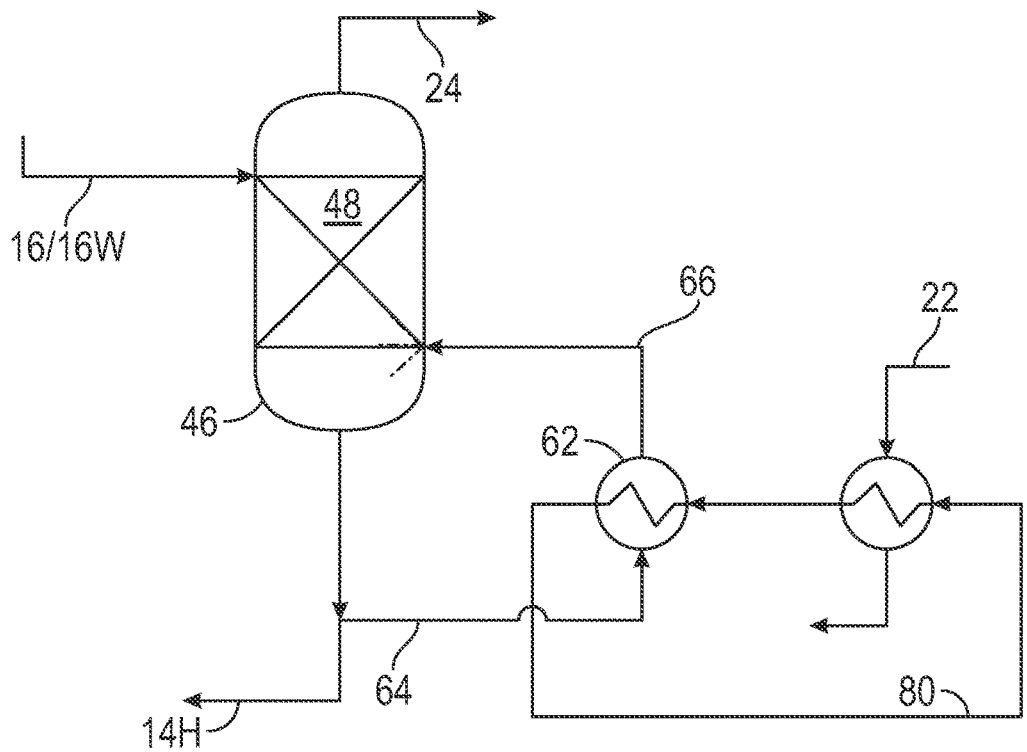

FIG. 3E shows a process for using an intermediate heat transfer fluid to transfer heat from a high temperature heat source, such as exhaust gas, to avoid exposing the solvent to high temperatures embodiments. Such embodiments may utilize an intermediate heat transfer fluid loop 80 to transfer heat from a high temperature heat source 22 to the lean solvent stripper bottoms stream 64. A recirculating heat exchange fluid, such as a high-temperature tolerant coolant (engine coolant, oil, or another suitable heat transfer fluid), may be heated via a high temperature heat source 22, such as engine gas recycle or exhaust gas. The hot heat exchange fluid may then pass through reboiler 62 to heat the lean solvent 64 and provide reboil 66 to the stripper 46.

Figure 3F:
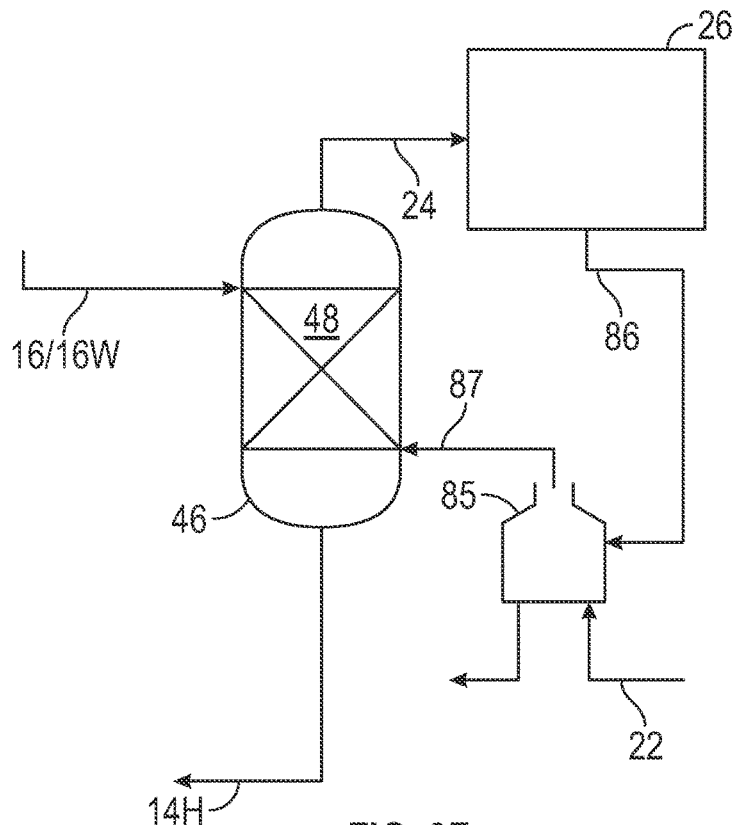
Figure 3G:
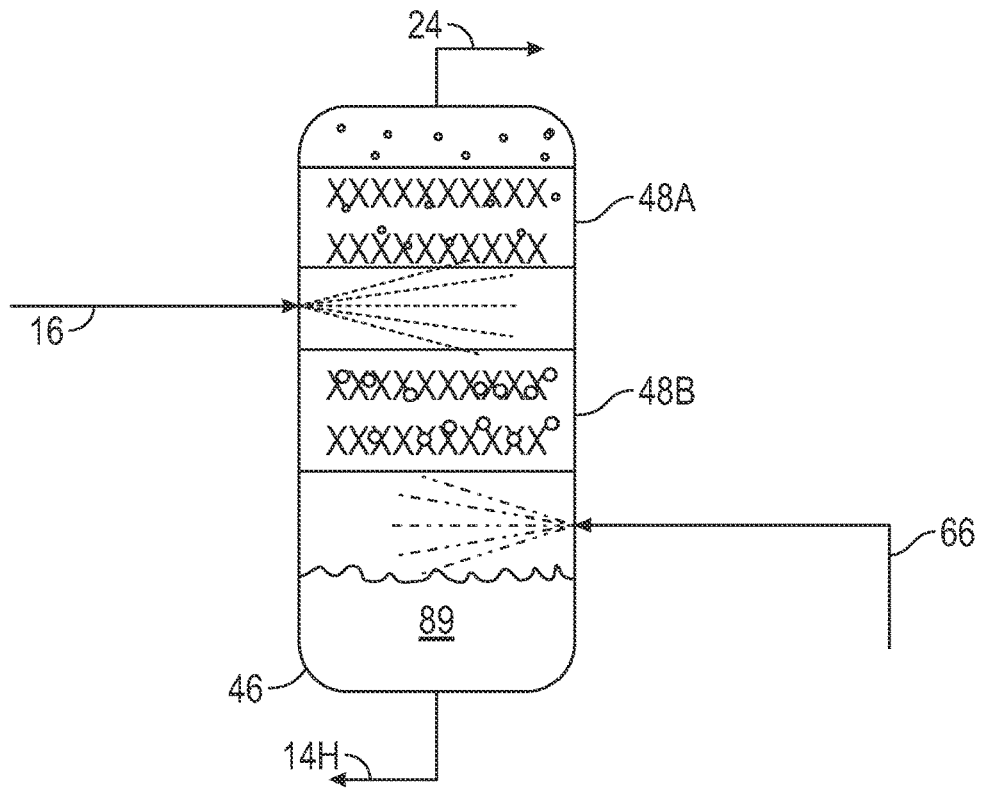

Another embodiment envisioned for desorption of the carbon dioxide and regeneration of the solvent is illustrated in FIG. 3F, using a steam generator to utilize waste heat and provide heat to the stripper column for solvent regeneration. In this embodiment, a steam boiler 85 is used to provide heat to the rich solvent. Rich solvent 16, which may be preheated if desired, is fed to the stripper 46, where it is contacted with steam 87, the resulting direct heat exchange warming the solvent and producing crude carbon dioxide vapor 24. Cooling and liquefaction stage 26 may separate any excess steam (water vapor) in the crude carbon dioxide. The water condensate 86 may then be returned to the steam boiler 85 for continued production of steam 87. Heat for driving the steam boiler may be provided by a heat source 22, such as exhaust gas or EGR, among other options.

FIG. 3G illustrates yet another embodiment of the desorption step that may be used to regenerate the solvent and recover a crude carbon dioxide stream. In this embodiment, one or more heat exchangers (not shown) and associated heat sources (not shown) may be used to superheat the rich solvent 16. The superheated rich solvent 16 may then be flashed across a nozzle and fed to stripper 46. Likewise, one or more heat exchangers (not shown) and associated heat sources (not shown) may be used to superheat the lean solvent. The superheated lean solvent 66 may then be flashed across a nozzle and fed to stripper 46. Contact of the superheated lean solvent and the superheated rich solvent within the stripper 46 may result in condensation of the solvent, which may collect in a stripper sump 89 for return to the absorber via lean solvent stream 14H, as well as result in production of crude carbon dioxide stream 24, which may be recovered as an overheads stream from the stripper. Contact structures provided in the stripper vessel may include demisters 48A and packing 48B, demister 48A providing for liquid disengagement and minimization of liquid entrainment in the overhead vapor stream 24, and packing 48B providing for contact of the superheated lean solvent for semi-rich solvent stripping.

Figure 4:
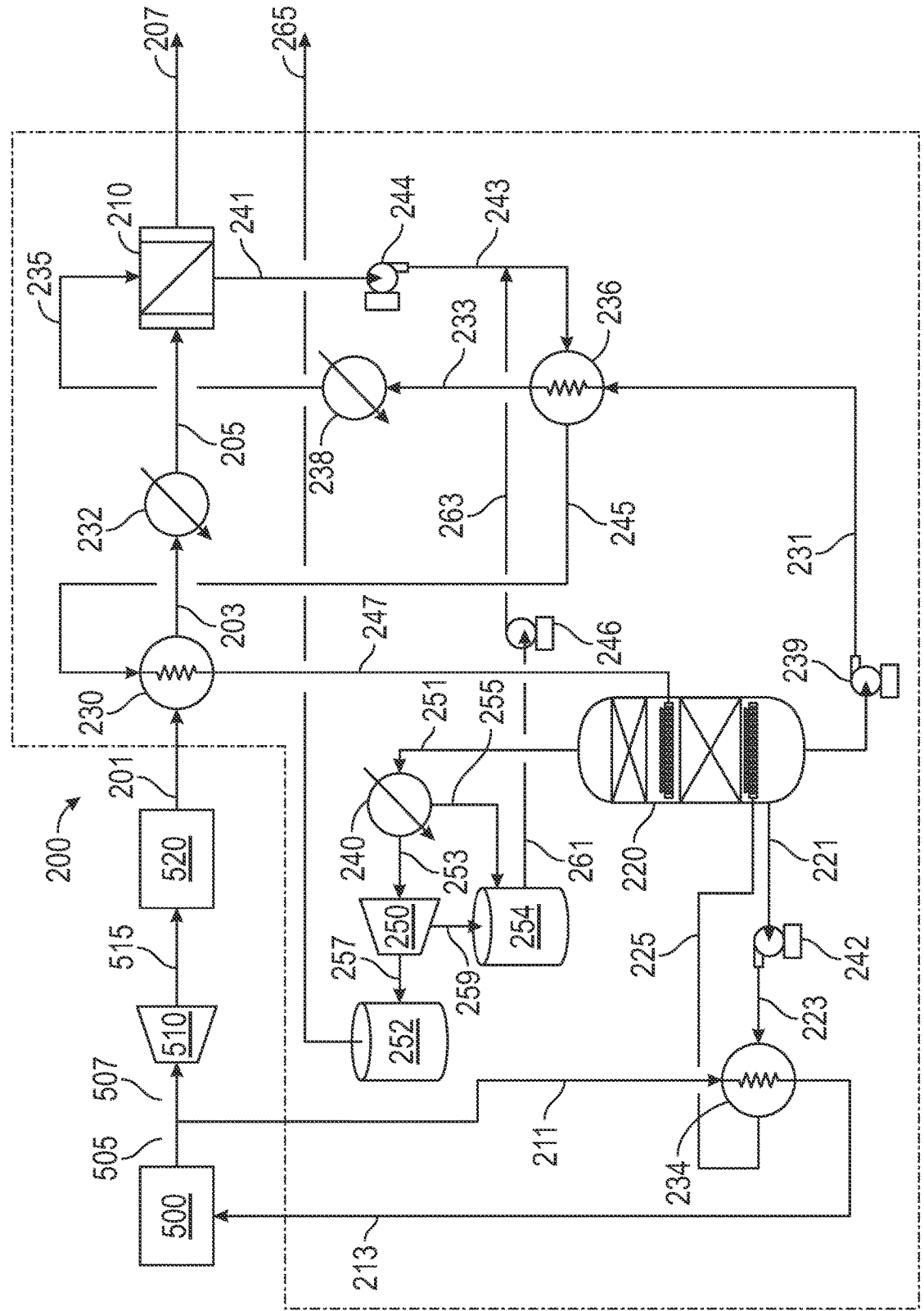
FIGS. 4 and 5 are simplified process flow diagrams of exhaust gas carbon dioxide capture and recovery systems, as provided in one or more embodiments.
Figure 5:
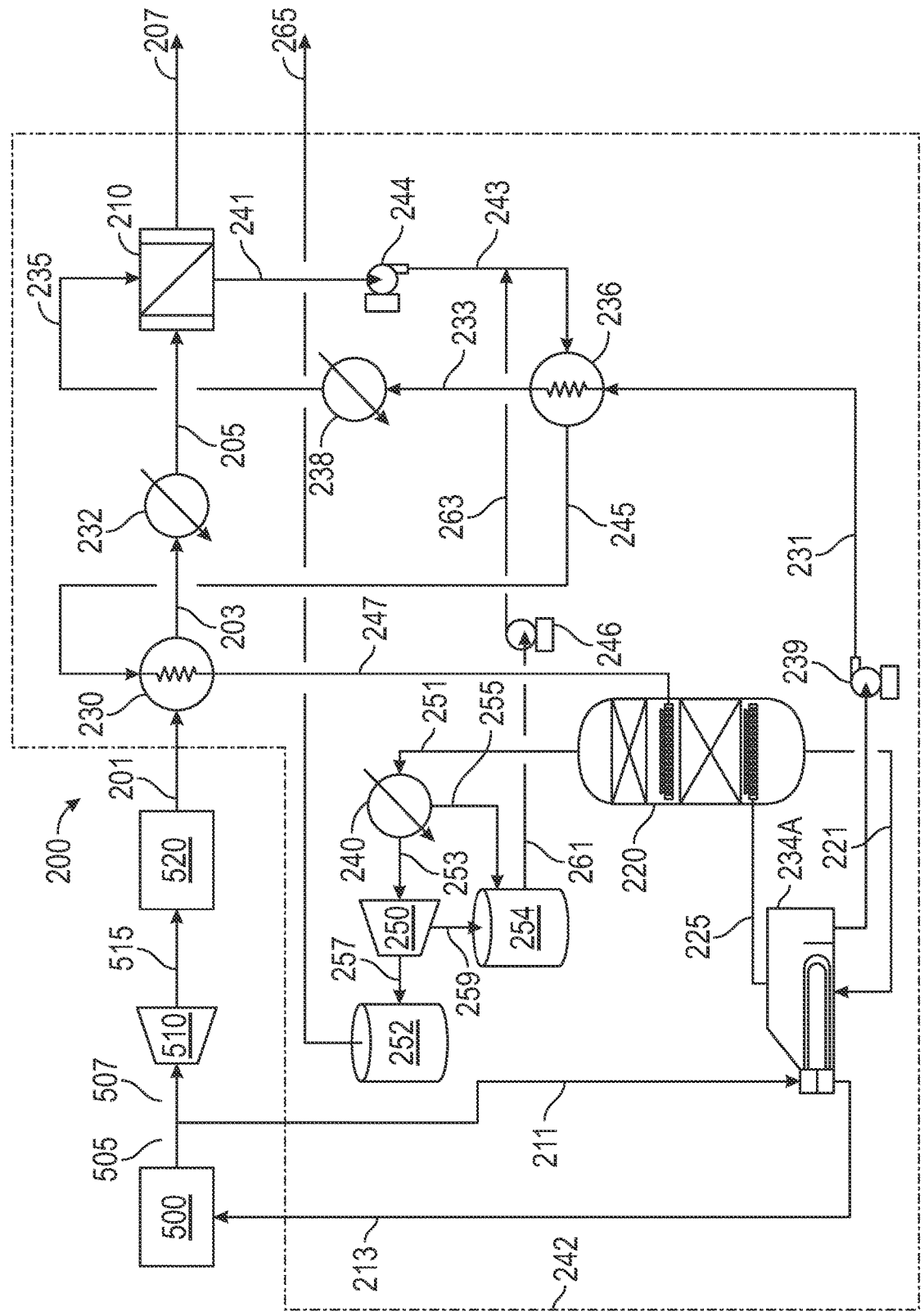

As described above, various means for adsorption of carbon dioxide and stripping of a rich solvent are envisioned. Such may be integrated into an engine system to capture carbon dioxide from the exhaust in various manners, where the heat necessary for the desorption may be provided by EGR, exhaust, intermediate heat transfer fluid loops, or other sources associated with the engine or the vehicle. FIGS. 4 and 5 show two of the many embodiments that may be envisioned integrating the absorption-desorption configurations as illustrated in one or more of FIGS. 3A-3G with an engine and exhaust gas recycle system. While FIGS. 4 and 5 show two more specific heat integration strategies as associated with other major system or engine components, other systems integrating the absorption-desorption configurations as illustrated and described herein, while not illustrated, are similarly envisaged.

FIG. 4 shows a simplified flow diagram of an exhaust gas carbon dioxide capture and recovery system ("system") according to one or more embodiments herein. The system is configured in size and in operation for use on a mobile vehicle while the vehicle is in use, that is, an engine is operating, converting fuel and oxygen into energy, and producing power for the vehicle or vessel. A byproduct of the process of converting fuel into energy using oxygen is that engine exhaust is created, which contains carbon dioxide. The systems herein may be configured in size for a wide variety of vehicles or vessels, which may have engines that vary greatly in size. For example, a semi-truck engine may have an engine six times larger than that of a car. Throughout the description of FIG. 4, exemplary flow rates are provided for a typical semi-truck engine that is operating at typical highway cruise conditions fully loaded. The flow rates, energy transfer, and other values provided are exemplary only, and may vary to a wide extent for other vehicle or vessel (automobile or marine) engines, as well as for other operating conditions (accelerating, low load, etc.).

The embodiment exhaust gas carbon dioxide capture and recovery system shown in FIG. 4, system 200, includes a number of operational units coupled to process engine exhaust containing carbon dioxide to remove at least some of the carbon dioxide before the exhaust is passed from the system. System 200 includes an exhaust absorber system 210, which extracts carbon dioxide from cooled tailpipe exhaust, using a system solvent. System 200 also includes a solvent regenerator 220, which recovers carbon dioxide from the system solvent. There are also several heat exchangers for not only recovering heat from exhaust gases but also utilizing such recovered heat to prevent waste and avoid using engine power for system operations. For example, an exhaust gas to rich solvent heat exchanger may extract heat from the exhaust stream and superheat the rich system solvent directed towards the solvent regenerator. An EGR to regenerator lean solvent heat exchanger extracts heat from the exhaust gas recirculation (EGR, which may alternatively be referred to herein as engine recycle, engine recycle gas, exhaust recycle, or similar terms) and superheats lean system solvent directed back to the solvent regenerator. A solvent-to-solvent heat exchanger permits the overall system to conserve thermal energy by transferring heat from hot lean solvent into cold rich solvent. On-board storage tanks are utilized for retaining products of the system, such as concentrated pressurized carbon dioxide, for off-loading and to support system operations. For example, the $CO_2$ onboard storage tank receives and stores the concentrated pressurized carbon dioxide product until it can be off-loaded. Several pumps and compressors are also utilized for system operations. For example, regenerator sump pump directs lean solvent to receive energy from the EGR loop. As well, solvent system pump is used to drive the solvent system from the exhaust absorber system to the solvent regenerator and back. System 200 also includes a $CO_2$ compressor 250, which compresses carbon dioxide into concentrated pressurized carbon dioxide for on-board storage. These units and more along with their relationship to one another will be described in forthcoming sections.

For the sake of clarity, there are a number of additional units shown that are not part of system 200 that are shown in FIG. 4. These units are provided in relief to assist in describing optional configurations and variations in embodiments herein. As well, such systems and apparatuses that may provide additional couplings, feeds, or sources of energy, are detailed to assist one of ordinary skill in the art the appreciating the vision of embodiments herein, including both system and process embodiments.

FIG. 4 shows an engine 500, in relief, which may be understood to be a combustion engine or motor or other mechanical device used to covert fuel (typically from a processed or finished fraction of hydrocarbons, such as natural gas, liquefied petroleum gas (LPG), gasoline, gas/oil mixtures, kerosene, diesel fuel, jet fuel, or fuel oil, such as a heavy marine fuel oil) in the presence of an oxygen source and heat into mechanical, hydraulic, electric, and combinations thereof, power. The combustion engine is mounted or permanently affixed to the mobile vehicle or vessel. The chemical conversion, such as through combustion of the fuel in the presence of an oxygen source, produces an exhaust gas that comprises carbon dioxide. Hot exhaust gas is passed from engine 500 via engine exhaust line 505.

FIG. 4 shows a turbo-compounding (TC) machine 510, in relief, that may optionally be used, and which may be coupled downstream of the engine 500 through TC feed line 507. For system 200, TC feed line 507, which provides at least a portion of the engine exhaust to the turbo-compounding machine 510, splits off from EGR feed line 211. Turbo-compounding machines typically extract additional exhaust enthalpy and convert it into mechanical, electrical, or both, energy, for systems in operating a vessel or a vehicle, such as the semi-truck 100 of FIG. 1. In doing so, the fuel-to-power conversion of the overall mobile vehicle or vessel is improved as waste thermal energy is recovered as power, improving efficiency and reducing the parasitic load of the carbon capture system which would otherwise draw power from the engine to spin the compressor and solvent pumps. As well, the pressure of the turbo-compounding machine exhaust discharge is also significantly reduced after passing through the turbo-compounding machine. Optionally, at least a portion of the extracted energy may be directed to one or more units to drive pumps or compressors using mechanical, electrical or hydraulic-type coupling systems. Such system variants will be described further. Turbo-compounding machine exhaust is passed from turbo-compounding machine 510 via turbo-compounding machine exhaust discharge line 515.

Vehicle emissions after treatment system (ATS) 520 is coupled downstream of turbo-compounding machine 510 through turbo-compounding machine exhaust discharge line 515. ATSs often include environmental mitigation operating subsystems, such as selective catalytic reduction (SCR), diesel oxidation catalyst (DOC), diesel particulate filters (DPFs), and diesel exhaust fluid (DEF), to remove impurities and unconsumed fuel from engine exhaust. In non-embodiment systems, after the ATS, exhaust gases are discharged as tailpipe exhaust feed into the environment. This is not the case in embodiment exhaust gas carbon dioxide capture and recovery systems. Tailpipe exhaust feed is passed from vehicle emissions ATS 520 via ATS discharge line 201.

In one or more embodiments, several exhaust feed streams are provided to the system. A first exhaust feed is provided to the exhaust gas to rich solvent heat exchanger to begin recovering additional heat from the exhaust gas as well as preparing the exhaust gas for carbon dioxide extraction. A second exhaust feed is provided to the EGR (exhaust gas recirculation) to regenerator lean solvent heat exchanger to provide a portion of the thermal energy needed to drive the solvent regeneration process. The second exhaust feed may be provided by an operating engine.

As shown in FIG. 4, system 200 has two introduced exhaust feeds. Tailpipe exhaust feed passes from the ATS 520 and into the system 200 through ATS discharge line 201. The tailpipe exhaust feed is introduced into exhaust gas to rich solvent heat exchanger 230. In system 200, ATS discharge line 201 fluidly couples ATS 520 to exhaust gas to rich solvent heat exchanger 230. For example, temperature of the tailpipe exhaust feed may be about 260° C. For example, the mass flow rate of the tailpipe exhaust feed may be about 14.6 kilograms/minute (kg/min). For example, the $CO_2$ concentration in the tailpipe exhaust feed may be about 8.98 vol % (6 vol % to 12 vol %, for example). As noted above, values may vary depending upon conditions and these exemplary values are for a long haul diesel truck at typical highway cruise conditions fully loaded. For a very low load condition, the mass flow rate of exhaust would be lower, and the $CO_2$ concentration may be as low as 1 vol %. As would be understood by one skilled in the art, these values are provided for exemplary purposes only, as the temperatures, rates, and concentrations may vary depending upon the engine type, engine load, engine efficiency, fuel type, and many other variables.

In FIG. 4, a second exhaust feed introduced into the system 200 is hot EGR feed. Hot EGR feed is introduced from the engine 500 through first EGR line 211 into EGR to regenerator lean solvent heat exchanger 234. In the embodiment of system 200, first EGR line 211 splits off from the outlet of engine 500 via engine exhaust line 505. For example, the temperature of the hot EGR feed may be about 438° C. (350° C. to 550° C.). For example, the mass flow rate of the engine recycle feed rate may be about 5.34 kilograms/minute (kg/min). Similar to the exhaust feed, EGR flow rates and temperatures will vary based on the engine type, engine load, etc. For example, some diesel engines may have EGR rates as high as 50 mass % of the engine exhaust, whereas current gasoline engines may recycle up to 20 mass % of the exhaust gas, without affecting combustion stability. As exemplified, the engine outputs about 20 kg/h exhaust, with about 26% (5.34 kg/h) of that exhaust being returned to the engine as EGR.

In one or more embodiments, several products are produced by the system. A first exhaust product is provided from an exhaust absorber system, which expels depleted exhaust product into the environment. The first exhaust product stream has a reduced carbon dioxide concertation compared to the first exhaust feed. A second exhaust product is provided from the EGR to regenerator lean solvent heat exchanger. The cooled EGR may be directed back towards an operating engine. The second exhaust product has a reduced temperature as compared to the second exhaust feed. A third product is a concentrated pressurized carbon dioxide that is introduced into and stored in a $CO_2$ onboard storage tank. The $CO_2$ onboard storage tank retains the concentrated pressurized carbon dioxide until it can be recovered from the vehicle or vessel using known means, such as a detachable container or a dedicated product transfer line.

As shown in FIG. 1, system 200 has several products that are produced. A depleted exhaust product that has a reduced amount of carbon dioxide passes from the system 200 through exhaust discharge line 207. In the embodiment of system 200, exhaust discharge line 207 couples to exhaust absorber system 210.

Cool EGR feed passes from the system 200 through second EGR line 213 back towards engine 500. In the embodiment of system 200 illustrated, second EGR line 213 couples to engine 500 to provide cooled exhaust gas for recirculation to the engine.

For the system configuration of system 200, concentrated pressurized carbon dioxide is discharged from $CO_2$ compressor 250, using $CO_2$ compressor discharge line 257, into $CO_2$ onboard storage tank 252. Concentrated pressurized carbon dioxide may be passed from the system 200 using a dedicated $CO_2$ product line 265. In the embodiment of system 200, $CO_2$ product line 265 couples to $CO_2$ onboard storage tank 252, which is configured to contain concentrated pressurized carbon dioxide.

A first exhaust feed is provided to the exhaust gas treatment system. Depending on the configuration of the system, the first exhaust feed may originate from one of several sources within the mobile vehicle or vessel. In one or more embodiments, at least a portion of the exhaust feed that is directed to the exhaust gas to rich solvent heat exchanger comes directly from the engine. In one or more embodiments, all of the exhaust feed that is directed to the exhaust gas to rich solvent heat exchanger comes directly from the turbo-compounding machine. In one or more embodiments, all of the exhaust feed that is directed to the exhaust gas to rich solvent heat exchanger comes directly from the vehicle emissions after treatment system.

There are several fluid flow pathways through system 200 that are useful for describing the overall system configuration. For system 200, a first engine exhaust gas pathway proceeds from the introduction of tailpipe exhaust feed into system 200 via ATS discharge line 201 until it is passed as a depleted exhaust product from the system using exhaust discharge line 207.

The tailpipe exhaust feed passes into exhaust gas to rich solvent heat exchanger 230. In FIG. 4, exhaust gas to rich solvent heat exchanger 230 is coupled to ATS 520 via ATS discharge line 201. Through this exchanger, the tailpipe exhaust feed is cooled as thermal energy is transferred into a rich system solvent flowing towards solvent regenerator 220. For example, the heat transferred from the tailpipe exhaust feed may be about 47.0 kW (kilowatts) in an exemplary embodiment; the heat transfer depends highly on the exhaust temperature, which may differ based on engine type and their respective exhaust temperatures. Configurations of the exhaust gas to rich solvent heat exchanger 230 may vary, and the exhaust gas may be passed on the shell side of the exchanger in some embodiments, or may be passed on the tube side of the exchanger in yet other embodiments. Cooled tailpipe exhaust passes from the exhaust gas to rich solvent heat exchanger 230 using cooled tailpipe exhaust line 203. In some embodiments, the temperature of the cooled tailpipe exhaust may be about 150° C. (130° C. to 170° C.), which, as noted above, is presented as an exemplary temperature, and may vary based on engine type, as well as the circulation rate of the rich solvent through the heat exchanger and regenerator 220 conditions, among other variables.

In some instances, a bypass line (not shown) is configured to optionally direct at least a portion of the tailpipe exhaust feed around exhaust gas to rich solvent heat exchanger. In such configurations, at least a portion of the tailpipe exhaust feed may be directed around the heat exchanger to prevent the exit temperature of the rich system solvent passing from the heat exchanger exceeding a system solvent temperature limit. As will be provided in more detail regarding the system solvent, this is both to prevent thermal degradation and extend the operational lifespan of the system solvent. As the rich system solvent is pressurized over the saturation pressure of the system solvent, "over-superheating", that is, raising the temperature of the pressurized rich system solvent to a temperature greater than the system solvent temperature limit, may be avoided by bypassing at least a portion of the exhaust gas flow around the exchanger when the conditions are appropriate. In other words, it is desired to maintain the rich solvent as a liquid through exchanger 230, and an exhaust bypass around exchanger 230 may be used, if necessary, to avoid partial vaporization of the rich solvent. In such instances, any bypassed tailpipe exhaust feed mixes with the cooled tailpipe exhaust downstream of exhaust gas to rich solvent heat exchanger.

In embodiments herein, the cooled tailpipe exhaust 203 passes into exhaust gas trim cooler 232. Exhaust gas trim cooler 232 is coupled to and downstream of exhaust gas to rich solvent heat exchanger 230 using cooled tailpipe exhaust line 203. Exhaust gas trim cooler 232 may be an air-based cooler that extracts heat into the atmosphere. As an exemplary range, the temperature of the exhaust may be reduced to or less than about 40° C., although this value may vary depending upon engine type, the solvent mixture being used, and other variables. In some configurations of exhaust gas trim cooler 232, the heat exchanger has exterior-fans that are activated upon an inlet temperature condition to pull air across the exposed tubes of the heat exchanger. In some other configurations, the heat exchanger has static heat fins that rely on ambient conditions to remove heat from the unit. Other static and active variations of trim coolers are envisioned. Active variations, such as a fan, may be powered by electrical or hydraulic power received from the turbo-compounding machine 510 or other convenient power supplies that may impart no or negligible parasitic load on the engine. The trimmed tailpipe exhaust passes from exhaust gas trim cooler 232, using absorber exhaust feed line 205, into exhaust absorber system 210. Optionally the exhaust may also bypass the absorber, for example, if insufficient cooling duty is available to reduce the exhaust temperature prior to entering the absorber. If the exhaust is too hot entering the absorber, damage to the contactor, solvent degradation, or $CO_2$ stripping from the solvent can occur. In some cases it may be advantageous to not bypass or partially bypass the rich solvent to exhaust heat exchanger to continue regenerating the solvent, even while the exhaust is not passing through the absorber.

In system 200, the trimmed tailpipe exhaust passes into exhaust absorber system 210. Exhaust absorber system 210 is coupled to and downstream of exhaust gas trim cooler 232 using absorber exhaust feed line 205. Exhaust absorber system 210 is configured to remove at least a part of the carbon dioxide from the exhaust gas introduced using cool lean system solvent.

In some embodiments, the $CO_2$ absorption into the lean system solvent and stripping from the exhaust gas occurs through direct contact. In one or more embodiments, the exhaust absorber system may have a configuration such as that of a direct liquid-gas contact column. In such a direct-contact configuration, the absorbing fluid—the liquid lean system solvent—and the fluid to be stripped—the exhaust gas—move in opposite directions relative to one another. While within the vessel, the two counter-flowing fluids may come into intimate contact with each other through various means, for example, spraying of the liquid into an empty vapor space, vapor bubbles percolating through liquid on trays, and liquid-vapor contact on the surfaces of metallic or non-metallic random or structured packing. While the exhaust gas is generally traversing upwards through the column, the lean system solvent strips at least some of the carbon dioxide from the exhaust gas, forming a $CO_2$-depleted exhaust product. As the exhaust gas rises up the column, the stripping efficacy of the system solvent becomes more effective as more "leaner" system solvent is exposed to the exhaust gas. At the top of the column, the now $CO_2$-depleted exhaust product is a resultant of the operation of the absorber.

In some embodiments, the exhaust absorber system may be configured similar to a traditional distillation column, such as with side-to-side alternating distillation trays, where lean system solvent flows generally downward and exhaust gases flow upwards. Another configuration may be one where the column has random or structured packing, or sections of both, where the lean system solvent and the exhaust gas take a generally counter-flow, torturous paths downwards and upwards, respectively. Another configuration is where a series of spray nozzles mist or atomize lean system solvent into the exhaust gas flow. Other variations and configurations of the liquid-gas contact absorber are understood by one of skill in the distillation and absorption arts, and are envisioned as applicable to this disclosed subject matter.

In other embodiments, the $CO_2$ absorption into the lean system solvent and stripping from the exhaust gas occurs through indirect contact. In some embodiments, the exhaust absorber system may have a configuration of a membrane absorber. In such an indirect-contact configuration, the absorbing fluid—the liquid lean system solvent—and the fluid to be stripped—the exhaust gas—are separated from one another by a membrane. The membrane may be a selective or a non-selective barrier that creates a large amount of interfacial area between the gas and liquid phases, while permitting flux (that is, transport) of gas species through the membrane into the solvent on the permeate side. The membrane contactor is typically used to contain the liquid within a structured, high-surface-area three-dimensional space instead of flowing freely as in a packed column. A number of factors, including, but not limited to, pressure and temperature on both the feed and the permeate sides of the membrane, the material of construction of the membrane, the permeability of the membrane, the surface contact area of the membrane, and the interaction of certain physical properties of the solvent with the membrane surface, affect the flux of carbon dioxide between the gas and liquid phases.

In some embodiments, the exhaust absorber system may be configured similar to a tubular membrane module, where a plurality of membranes are in the shape of tubes. The exhaust gas passes through the shell portion; the system solvent flows through the interior side of the membrane tube. In some embodiments, the exhaust absorber system may be configured similar to a hollow fiber membrane system with a similar configuration (the exhaust is on the exterior-surface side of the hollow fibers; the system solvent is in the interior of the hollow fibers). In some embodiments, the exhaust absorber system may be configured similar to a spiral wound membrane. In some embodiments, the exhaust absorber system may be configured similar to a plate and frame membrane module. Other variations and configurations of the cross-flow membrane absorber are understood by one of skill in the membrane separation arts, and are envisioned as applicable to this disclosed subject matter.

In some embodiments, the absorber membrane is not preferentially selective towards any chemical specie. In instances where there is no preferential selectivity, it may be desired to have a high rate of flux through the membrane of all chemical species present in the exhaust feed, especially given that a dominant chemical specie is the desired material to strip from the exhaust feed. In some embodiments, the absorber membrane is made of a polypropylene (PP) material. In some embodiments, the absorber membrane is made of a polytetrafluoroethylene (PTFE) material. In some embodiments, the absorber membrane is made of polyether ether ketone (PEEK) material.

In some other embodiments, the material of construction for the membrane may be selected from any material that is selective towards carbon dioxide. In some embodiments, the absorber membrane is "highly selective" towards carbon dioxide. Highly selective means that the membrane selectivity towards a first specie is at least a factor of 10× greater than any other chemical specie in the feed. However, it is known that, in some such instances, membranes with a high selectivity towards a certain chemical specie may not have a suitable flux rate for that chemical specie.

Similar to the direct-contact absorber configuration, in some embodiments the lean system solvent and the exhaust gas may move in opposing directions within a cross-flow membrane absorber. In other embodiments, the lean system solvent and the exhaust gas may move in the same direction within a cross-flow membrane absorber. In yet other embodiment, the lean system solvent and the exhaust gas may move in perpendicular directions to one another. Unlike the direct-contact absorber, a membrane may permit the two fluids to travel in a variety of directions relative to one another while the transport of carbon dioxide occurs.

A first exhaust product stream of depleted exhaust product is passed from the system. The now $CO_2$-depleted exhaust product passes out of exhaust absorber system and from the system 200. In FIG. 4, system 200 shows exhaust discharge line 207 is used to pass depleted exhaust product (with a significant amount of its carbon dioxide and thermal energy extracted) into the environment. Regardless of overall physical configuration, contact or absorption means, the exhaust absorber system is efficient in removing carbon dioxide from the introduced exhaust gas. In some embodiments, the amount of $CO_2$ absorbed accounts for 20% to 90% of the carbon dioxide in the introduced exhaust; from 35% to 50% of the carbon dioxide in the introduced exhaust in other embodiments, or from 40% to 45% of the carbon dioxide introduced in yet other embodiments (each on a mass or mole basis). As would be appreciated by one skilled in the art, embodiments herein may provide for designs that may be used to capture a high amount of the $CO_2$; however, the feasibility to do such may be limited based on the system size, the energy required, and the $CO_2$ onboard storage requirements. In some embodiments, such as for an engine exhaust having 7 vol % to 10 vol % $CO_2$, the $CO_2$ concentration in the depleted exhaust product may be less than 7 mol %, such as in the range from about 0.1 mole % to about 6 mole % in some embodiments, or from about 2 mole % to 5 mole % in other embodiments. In some embodiments, the temperature of the depleted exhaust product is in the range from ambient temperature to around 40° C., for example; the temperature of the depleted exhaust product 207 exiting the absorber system 210 may vary based on engine and $CO_2$ capture system design.

Achievable capture rates for various systems were estimated based on the exhaust temperature and $CO_2$ concentration according to the following. Available heat was calculated based on the exhaust temperature and heat capacity assuming cooling to 135° C. The rich loading was estimated based on a driving force for absorption of the partial pressure of $CO_2$ in the rich solvent being five times the partial pressure of $CO_2$ in the inlet exhaust. 9 molal monoethanolamine was used to estimate the vapor liquid equilibrium and regeneration energy due to its well-characterized properties. Optimal lean loading and liquid rate were determined for each rich loading to minimize reboiler duty and maximize the capture rate. Specific work was calculated assuming 80% of isentropic efficiency for pumps and compressors. Capture rates are calculated by dividing the available exhaust heat by the estimated specific heat required for solvent regeneration only ("heat"), or solvent regeneration plus $CO_2$ compression and solvent circulation ("heat and work").

Estimated achievable capture rates are primarily influenced by two factors: the temperature of the exhaust, and the amount of $CO_2$ removed to achieve a given capture rate. The system efficiency, which improves with higher $CO_2$ content streams, is a secondary factor. Thus for higher $CO_2$ concentration exhaust streams, the better efficiency is more than offset by the amount of $CO_2$ to be captured-leading to a lower predicted capture rate at a given exhaust temperature.

The following tables illustrate the estimated conditions and results for achievable capture rates for various engines. Note that these numbers are for illustrative purposes only, and may be higher or lower depending upon the design of various process equipment, operating conditions, and system efficiencies achieved.

TABLE 2A

| Application | Nominal Exhaust Temperature (° C.) | Nominal $CO_2$ Concentration (mol. %) | Nominal exhaust gas flow rate (kg/min) | Predicted Cap Rate-heat (%) | Predicted Rate-heat and work (%) |
|---|---|---|---|---|---|
| Car | 450 | 12 | 1 | 49 | 40 |
| Truck | 310 | 9 | 15 | 34 | 26 |
| Generator | 460 | 7 | 120 | 77 | 63 |
| Ship | 220 | 4.5 | 700 | 28 | 20 |

TABLE 2B

| Application | Lean loading (mol $CO_2$/mol MEA) | Rich loading (mol $CO_2$/mol MEA) | Liquid rate (kg/kg exhaust gas) | Stripper pressure (kPa) |
|---|---|---|---|---|
| Car | 0.40 | 0.50 | 8.6 | 241 |
| Truck | 0.40 | 0.49 | 6.2 | 225 |
| Generator | 0.39 | 0.48 | 4.7 | 215 |
| Ship | 0.37 | 0.46 | 2.8 | 202 |

TABLE 2C

| Application | Spec. Heat (MJ/kg $CO_2$) | Spec. Work (KJ/kg $CO_2$) | Spec. Eq. Heat (MJ/kg $CO_2$) | Available Exhaust Heat (MJ/kg $CO_2$) |
|---|---|---|---|---|
| Car | 3.9 | 0.35 | 4.8 | 1.9 |
| Truck | 4.1 | 0.35 | 5.3 | 1.4 |
| Generator | 4.3 | 0.36 | 5.3 | 3.3 |
| Ship | 4.8 | 0.36 | 6.6 | 1.3 |

Process innovations that add complexity, such as absorber intercooling, stripper interheating, stripper condensate heat recovery, and high temperature/pressure and multi-stage solvent regeneration, solvent regeneration could reduce specific heat requirements, as could use of advanced high performance solvents. Further, use of heat from other sources (EGR, hot coolant, hot engine lubricant) could increase the available heat and thus the capture rates.

A second exhaust feed is provided to the system 200 along the EGR loop. For the embodiment of system 200 as illustrated, a second engine exhaust gas pathway proceeds from the introduction of hot EGR feed into system 200 via first EGR line 211 until it passes from the system 200 as cool EGR feed using exhaust second EGR line 213.

In various embodiments, the hot EGR feed passes into EGR to regenerator lean solvent heat exchanger 234. In FIG. 4, EGR to regenerator lean solvent heat exchanger 234 is coupled to engine 500 via first EGR line 211 of the EGR loop. Through this exchanger, the exhaust gas recirculation is cooled as heat is transferred into the lean system solvent, which is directed back into the solvent regenerator 220. This energy provide a portion of heat that drives the operation of the solvent regenerator. Cool EGR feed passes from the EGR to regenerator lean solvent heat exchanger 234 using second EGR line 213.

A second exhaust product of cooled EGR is passed from the system. The cool EGR feed passes out of EGR to regenerator lean solvent heat exchanger and also from the system. The cool EGR feed is significantly cooler, which may help engine operations, than the hot EGR feed provided by the engine. In system 200, second EGR line 213 is used to pass exhaust gas recirculation product back into engine 500. The EGR may be cooled in exchanger 234, for example, from a temperature of about 438° C. (engine 500 exhaust temperature) to a temperature in the range from about 100° C. to about 250° C., where cooler temperatures may help improve engine performance due to the added cooling provided by the recycled gas, as well as reduce NOx emissions.

A lean system solvent regenerator reboiler loop is used to extract heat from the EGR and convey that energy into the solvent regenerator. Lean system solvent is directed from the base of the solvent regenerator through both a regenerator sump pump and an EGR to regenerator lean solvent heat exchanger and back into the solvent regenerator slightly above the take-out point for the lean system solvent regenerator reboiler loop. Through the lean system solvent regenerator reboiler loop, lean system solvent is converted into a superheated lean system solvent such that thermal energy may be conveyed into and the pressure maintained in the solvent regenerator. The waste energy recovered from the EGR assists in the regeneration of lean system solvent from rich system solvent by reversing the carbon dioxide absorption reaction and driving carbon dioxide out of the liquid thermally.

Lean system solvent is passed from the solvent regenerator to the reboiler loop. As previously described and shown in FIG. 4, a regenerator sump pump 242 draws lean system solvent from a location proximate to the bottom of the solvent regenerator using regenerator reboiler feed line 221, which couples regenerator sump pump 242 to solvent regenerator 220. In some embodiments, the lean solvent passing through regenerator sump pump is pressurized to a pressure greater than the saturation pressure of the system solvent at the temperature of the lean solvent exiting lean solvent heat exchanger 234, thus maintaining the lean solvent as a liquid within the exchanger 234 and the associated circulation loop. For example, in some embodiments, the pressure of the pressurized lean solvent in the reboiler loop may be about 3.7 bars, although such may vary system to system, depending upon the solvent used and the lean solvent temperature exiting lean solvent heat exchanger 234. Pressurized lean system solvent passes from regenerator sump pump 242 to EGR to lean solvent heat exchanger 234 using sump pump discharge line 223.

In some embodiments, the rate of lean system solvent draw by the lean regenerator sump pump 242 is adjusted such that the superheated lean system solvent passing from the EGR to regenerator lean solvent heat exchanger 234 has a temperature that is less than or equal to a system solvent temperature limit. In some embodiments, the system solvent temperature limit may be about 120° C. In other embodiments, the system solvent temperature limit may be about 125° C. In yet other embodiments, the system solvent temperature limit may be about 150° C. Although recovering greater amounts of heat by increasing the system solvent temperature limit beyond 150° C. may improve desorption of carbon dioxide from the rich system solvent, the increased heat may result in degradation of the system solvent and therefore a reduction in operable lifespan. Reducing the amount of maintenance to the system, including system solvent exchange by increasing solvent lifetime, is a feature of the system configuration and its method of operation. The system solvent temperature limit may vary, depending upon the solvent used, the thermal stability of said solvent, as well as $CO_2$ adsorption efficiency of the solvent used, among other factors, including desired maintenance cycles.

In order to control the maximum temperature of the lean solvent, which is pressurized to a level greater than atmospheric pressure but less than critical pressure, the mass flow rate through the reboiler loop is modified by adjusting the pumping rate of the regenerator sump pump. Modifying the fluid flow through the exchanger by reducing or increasing the pumping rate prevents overheating of the pressurized lean solvent past the system solvent temperature limit. For example, if the exit temperature on the lean solvent side of the EGR to regenerator lean solvent heat exchange is approaching the system solvent temperature limit, the flow rate of solvent through the exchanger may be increased. A greater flow rate through the exchanger will reduce outlet temperature of the EGR to regenerator lean solvent heat exchange on the lean system solvent side even though more heat may be transferred into the now superheated lean systems solvent. In some instances, as an exemplary value, the mass flow rate of the lean system solvent in the reboiler loop is in a range of about 0.5 to 2 times the main solvent recirculation rate, the value of which may depend upon engine size, type, etc. The maximum temperature of the lean solvent passing through the EGR to solvent heat exchanger can also be moderated by reducing the flow of EGR through the lean solvent to EGR heat exchanger. Optionally a second EGR cooler can be incorporated to allow any EGR which bypasses the solvent to EGR cooler to be cooled in a separate cooler using engine coolant.

Optionally, in some embodiments, the regenerator sump pump is coupled to the mobile vehicle or vessel to receive power. In such a configuration, the lean regenerator sump pump may receive some or all of its power requirement from the rotation of a crank shaft. The coupling of the lean regenerator sump pump may be through means that provides energy in various forms, including, but not limited to, electrical, hydraulic, mechanical, or a combination thereof, means. Energy expended by turning of a crank shaft may be partially recovered, converted, stored, and transmitted through electrical systems (spinning of magnetic couplings), hydraulic systems (pumping and pressurization of hydraulic fluid), or mechanical systems (gear box) to facilitate the work performed by the regenerator sump pump. Such configurations can help to minimize the parasitic power required to operate the regenerator sump pump. In other embodiments, the regenerator sump pump may receive power from the turbo-compounding machine 510 or from the vehicle or vessel's electrical battery or electrical system. The manner in which power is supplied, as for other powered equipment for system 200, may be such that a minimal parasitic effect is applied to the engine.

In embodiments herein, the pressurized lean solvent passes into EGR to regenerator lean solvent heat exchanger 234. In FIG. 4, EGR to regenerator lean solvent heat exchanger 234 is coupled to regenerator sump pump 242 via sump pump discharge line 223. As previously described, EGR feed also is introduced into the heat exchanger. In this exchanger, the exhaust gas recirculation is cooled as heat is transferred into the pressurized lean system solvent, forming a superheated lean system solvent. The superheated lean system solvent passes from the EGR to regenerator lean solvent heat exchanger 234 using regenerator reboiler return line 225.

Superheated lean system solvent is introduced into the solvent regenerator. The superheated lean system solvent passing through the solvent to EGR heat exchanger is returned to the solvent regenerator. The inlet to the solvent regenerator is proximate to the middle or bottom of the solvent regenerator but above the take-off point for lean system solvent for the reboiler loop, which may be a bottom of the vessel in some embodiments, providing for a level of liquid in the sump, and which may be determined by the solvent inventory. As previously indicated, the thermal energy extracted from the EGR feed is transferred into the regeneration process to assist in driving out carbon dioxide from rich system solvent. For example, the heat transferred by the reboiler loop from the EGR feed into the solvent regenerator may be about 30.6 kW (kilowatts) (exemplary value, as noted above).

While the lean solvent reboiler system is illustrated in FIG. 4 and described above as including a sump pump 242 and a heat exchanger 234, embodiments herein may also use a kettle type reboiler to cool the EGR and heat the lean solvent to provide reboil vapors to the solvent regenerator 220, such as illustrated in FIG. 5. Lean solvent 221 exits the bottom of the column 220, flows into the reboiler 234A, where it indirectly contacts the exhaust, and then spills over a weir before exiting from the bottom of the reboiler unit 234A. Meanwhile vapor, primarily in the form of steam but also containing some $CO_2$, exits from the top of the reboiler 234A via flow line 225 and is passed to the regenerator 220. The steam rises through the regenerator and contacts the rich solvent entering from the top. The steam condenses as it rises up and the heat of condensation heats the rich solvent, releasing $CO_2$. The kettle type reboiler configuration may advantageously reduce pumping work (no need for high pressure solvent) and complexity (the circulation pump to move solvent through the EGR to solvent exchanger can be eliminated in some cases), as well as provide for more efficient use of exhaust heat in the stripper, as the steam may be able to interact better with the solvent. However, such a configuration may also be less compact system than other reboiler systems. Plate and frame style reboilers can also be used, and may provide a middle ground with respect to efficiency, complexity, and compactness.

For exemplary purposes, the temperature delta between the solvent at the outlet of the EGR to solvent heat exchanger and the regenerator sump may be around 5-20 degrees. However the specific value depends on the amount of $CO_2$ being desorbed, and the liquid rate, among other factors.

A solvent system loop between the solvent regenerator and the exhaust absorber system acts as a thermal swing absorption system for extracting carbon dioxide from exhaust gases and recovering the carbon dioxide for on-board storage. As well, the solvent system loop also extracts energy from the exhaust gas as the primary means for driving the capture and release process. Through this process, the pressure and temperature of the system solvent are manipulated using several heat exchangers and a solvent pump so that the system solvent may at different times and locations either absorb carbon dioxide and become a "rich" solvent or desorb the carbon dioxide and become a "lean" solvent.

For a mobile on-board carbon dioxide extraction system, the system solvent must meet several design requirements. Because of the compact and mobile nature of the system, solvents having relatively high cyclic $CO_2$ carrying capacity, a fast rate of reaction with carbon dioxide, and a relatively significant heat of absorption would permit relatively reduced liquid solvent circulation rates, greater $CO_2$ capture rates, and allow for solvent regeneration at greater pressures than in static and larger systems. Less solvent also has a capital impact on the system, permitting smaller heat exchangers, solvent regenerator, exhaust absorber system, pumps, and other ancillary system equipment.

Solvents useful for the mobile on-board carbon dioxide capture system include aqueous solutions of water soluble amines, amino acids, alkaline salts, and combinations thereof. Examples of useful water soluble amines include, but are not limited to, monoethanolamine (MEA), diethanolamine (DEA), methyl diethanolamine, piperazine and its derivatives (for example, 1-methyl-piperazine, 2-methyl-piperazine, N-aminoethyl-piperazine), morpholine, 2-amino-2-methyl-propanol, diisopropanolamine, ethylenediamine, hexamethylenediamine, and combinations thereof. Other water soluble amines may be primary, secondary, or tertiary amines, and combinations thereof. For example, the system solvent may include MEA in a range of from about 5 to about 10 molar concentration (M) in water.

Examples of useful amino acids include, but are not limited to, Group One salts of amino and amino sulfonic acids, such as alpha alanine, beta alanine, taurine, 2-amino-2-methyl-propionate, N-methyl-L-alanine, homotaurine, proline, serine, glycine, and combinations thereof. "Group One" is defined as Group I of the Periodic Table of Elements, including, but not limited to, sodium and potassium. Further examples of useful amino acids include, but are not limited to, Group One salts of primary, secondary, and tertiary amino and amino-sulfonic acids, and combinations thereof. Primary and secondary amino acid solvents may have reduced volatility, reduced toxicity, better biodegradability, a faster rate of reaction, and greater heat absorption than other carbon dioxide absorbing solvents.

Examples of useful alkaline salts include, but are not limited to, Group One and Group Two alkaline salts, and combinations thereof. "Group Two" is defined similarly as Group One (meaning Group II of the Periodic Table). For example, potassium, calcium, and sodium carbonates, and mixtures thereof, in water are useful system solvents.

In some instances, the system solvent is alkaline in pH, for example, being a pH in a range of from about 8 to about 12. In some instances, the system solvent is configured such that it is operable to absorb carbon dioxide at about 40° C. (20° C. to 60° C. in various embodiments) and to desorb the carbon dioxide at a temperature equal to or greater than about 90° C. (80° C. to 200° C. in various embodiments, such as 95° C. to 120° C. in some embodiments).

Lean and heated system solvent passes from the bottom of the solvent regenerator towards the exhaust absorber system. In the system shown in FIG. 4, hot lean system solvent passes from the bottom of the solvent regenerator 220 using regenerator bottoms line 231. For example, the temperature of the hot lean system solvent is about 115° C. In some instances, the pressure of the hot lean system solvent is in a range of from about 2.1 to 2.7 bar. The operating pressure of the solvent regenerator 220 may be sufficiently low so as to effectively desorb carbon dioxide from the rich solvent, while being high enough to limit the amount of water vaporized per mole of $CO_2$ within the regenerator. The operating pressure of the solvent regenerator may also be sufficient for causing a flow of lean solvent from the solvent regenerator 220 bottoms to the absorber system 210. In other embodiments, a lean solvent circulation pump (not illustrated) may be used to forward lean solvent from the solvent regenerator 220 to the absorber system 210. Depending upon the solvent mixture, pressure, and temperature of the solvent regenerator, carbon dioxide loading in the lean system solvent may be in the range from about 0.15 to about 0.45 mol $CO_2$/mol alkalinity, such as in the range from about 0.2 to about 0.5 mol $CO_2$/mol alkalinity, or about 0.31 to about 0.43 mol $CO_2$/mol alkalinity in other embodiments. In an exemplary embodiment, for example, the carbon dioxide loading in the lean system solvent may be about 0.43 mol $CO_2$/mol alkalinity.

A solvent-to-solvent heat exchanger is used to extract heat from the lean system solvent side and transfer it to the rich system solvent side. In some embodiments, the hot lean system solvent passes into solvent-to-solvent heat exchanger 236. In FIG. 4, solvent-to-solvent heat exchanger 236 is coupled to the bottom of solvent regenerator 220 by regenerator bottoms line 231. In this exchanger, the hot lean system solvent is cooled as heat is transferred into the pressurized rich cold system solvent, forming a cold lean system solvent. The cold lean system solvent passes from solvent-to-solvent heat exchanger 236 using cooled lean solvent line 233.

As previously indicated, the thermal energy extracted from the hot lean system solvent is transferred into the rich system solvent to help drive out carbon dioxide from the rich system solvent in the solvent regenerator. As well, cooling the lean solvent assists in preparing the lean solvent for use within the exhaust absorber system. For example, in an exemplary embodiment, the heat transferred by the hot lean system solvent into the cold pressurized rich system solvent may be about 241 kW. The temperature difference between the inlet and outlet for the lean solvent is significant. For example, in the exemplary embodiment, the inlet temperature of the hot lean system solvent may be about 115° C.; the outlet temperature of the cold lean system solvent may be about 45° C. Typically a cold-side approach temperature of 5-10 C is targeted, resulting in a hot-side approach temperature of about 10-15 C. Larger heat exchangers lead to better heat recovery (lower approach temperature) at the expense of higher equipment cost and space.

In embodiments herein, the cold lean system solvent passes into lean solvent trim cooler 238. Lean solvent trim cooler 238 is coupled to and downstream of solvent-to-solvent heat exchanger 236 using absorber lean system solvent feed line 233. Lean solvent trim cooler 238 is an air-based cooler that extracts heat into the atmosphere such that the lean system solvent temperature is reduced to or less than about 40° C. in the exemplary embodiment. In some configurations of lean solvent trim cooler, the heat exchanger has exterior-fans that are activated upon an inlet temperature condition to pull air across the exposed tubes of the heat exchanger. In some other configurations, the heat exchanger has static heat fins that rely on ambient conditions to remove heat from the unit. Other static and active variations of the trim cooler are envisioned. As with the exhaust gas trim cooler, the active variations envisioned may be powered by electrical or hydraulic power received from the turbo-compounding machine 510 or other convenient power supplies that may impart no or negligible parasitic load on the engine. The trimmed lean system solvent passes from lean solvent trim cooler 238 using absorber lean system solvent feed line 235 into exhaust absorber system 210. In the exemplary embodiments, the temperature of the trimmed lean system solvent may be about 40° C. If necessary, a booster pump 239 may be provided to boost the pressure of the bottoms stream 231 to overcome the pressure drop in exchangers 236, 238, and the exhaust absorber system 210. Pump 231 may also be used to ensure that there is a positive pressure at the inlet to pump 244, which may be used to control the flow rate.

Lean system solvent is introduced into the exhaust absorber system. In system 200, the trimmed lean system solvent passes into exhaust absorber system 210. Exhaust absorber system 210 is coupled to and downstream of lean solvent trim cooler 238 absorber lean system solvent feed line 235. As previously described, exhaust absorber system 210 is configured to remove at least some of the carbon dioxide from introduced exhaust gas using trimmed lean system solvent, forming a carbon dioxide "rich" system solvent.

The configuration of the exhaust absorber and operations of the exhaust absorber on the exhaust gas side has been previously provided. In some embodiments, the exhaust absorber is configured to directly contact lean system solvent with exhaust gas. In some embodiments, the exhaust absorber is configured to indirectly contact lean system solvent with exhaust gas.

Regardless of overall physical configuration, contact or absorption means, the exhaust absorber system is efficient in removing carbon dioxide from the introduced exhaust gas and enriching the system solvent. The lean solvent liquid may be fed to the absorber system at a ratio to the exhaust gas at a ratio, for example, in the range from about 2 to about 9, such as in the range from about 2.5 to about 6.5, or such as in the range from about 3.5 to about 5.5, on a mass basis. In an exemplary embodiment, the liquid to gas ratio of lean solvent to exhaust gas is about 4.44 on a mass basis. Depending upon the solvent mixture, pressure, and temperature of the absorber system, carbon dioxide loading in the rich system solvent may be in the range from about 0.25 to about 0.65 mol $CO_2$/mol alkalinity, such as in the range from about 0.3 to about 0.55 mol $CO_2$/mol alkalinity, or from about 0.35 to about 0.5 mol $CO_2$/mol alkalinity in other embodiments. In an exemplary embodiment, the carbon dioxide loading of the lean system solvent introduced may be about 0.43 mol $CO_2$/mol alkalinity, whereas the rich system solvent passing from the absorber system may be about 0.50 mol $CO_2$/mol alkalinity. As with other exemplary values provided herein, the values above may vary based on the solvent, capture rate, lean loading, absorber size, and other factors.

Rich and cool system solvent passes from the exhaust absorber system and is directed back towards the solvent regenerator. Regardless of exhaust absorber system configuration used, the rich system solvent product passes out of exhaust absorber system to continue onwards through the solvent system loop. In the exemplary embodiment, the temperature of the produced cold rich system solvent may be about 40° C. to 60° C.

As shown in FIG. 4, a solvent system pump 244 draws cold rich system solvent from exhaust absorber system 210 using absorber product line 241, which couples solvent system pump 244 to exhaust absorber system 210. In some instances, the mass flow rate of the system solvent in the solvent system loop is in a range from about 64 kg/min to 90 kg/min in the exemplary embodiment for a target capture rate of 40% from a long-haul Class 8 semi-truck.

The rich system solvent from the absorber unit is pressurized such that the rich system solvent can be heated and then superheated using a series of heat exchangers before being introduced into the solvent regenerator. As noted above, embodiments herein may maintain the rich solvent as a liquid through exchanger 230, and solvent system pump 244 may be used to elevate the pressure of the rich system solvent to a pressure sufficient to maintain the rich system solvent as a liquid, avoiding vaporization of any water or carbon dioxide, until it is distributed into the solvent regenerator. In some embodiments, the rich system solvent passing from solvent system pump 244 is pressurized to a pressure greater than the saturation pressure of the system solvent. For example, the pressurized rich cold solvent discharged from the solvent system pump 244 may have a pressure in a range of from about 4.3 to 7.2 bars. The pressurized rich cold system solvent passes from solvent system pump 244 towards solvent-to-solvent heat exchanger 236 using solvent system pump discharge line 243.

Optionally, in some embodiments, the solvent system pump is coupled to the mobile vehicle or vessel to receive power. In such a configuration, the solvent system pump may receive some or all of its power requirement from the rotation of the crank shaft. The coupling of the solvent system pump may be through means that provides energy in various forms, including, but not limited to, electrical, hydraulic, mechanical, or a combination thereof, means. This relationship between the crank shaft of the mobile vehicle or vessel and the solvent system pump is similar in configuration and purpose as previously described for the crank shaft and the regenerator sump pump. In other embodiments, the regenerator sump pump may receive power from the turbo-compounding machine 510 or from the vehicle or vessel's electrical battery or electrical system. The manner in which power is supplied, as for other powered equipment for system 200, may be such that minimal parasitic effect is applied to the engine.

A solvent-to-solvent heat exchanger is used to heat the rich system solvent by extracting heat from the lean system solvent. The pressurized rich system solvent receives energy from the lean solvent coming from the bottom of the solvent regenerator. In system 200, the pressurized rich cold system solvent passes into solvent-to-solvent heat exchanger 236. In FIG. 4, solvent-to-solvent heat exchanger 236 is coupled to the solvent system pump 244 by solvent system pump discharge line 243. In this exchanger, the pressurized rich cold system solvent is heated, forming a pressurized rich hot system solvent. The pressurized rich hot system solvent passes from solvent-to-solvent heat exchanger 236 using heated rich solvent line 245.

The thermal energy passed from the hot lean system solvent is transferred into the rich solvent to help drive out carbon dioxide from the rich system solvent in the solvent regenerator. The temperature difference between the inlet and outlet for the rich solvent is significant. For example, in the exemplary embodiment, the inlet temperature of the pressurized rich cold system solvent may be about 40° C. to 50° C.; the outlet temperature of the pressurized rich hot system solvent may be about 110° C. to about 115° C.

The solvent-to-solvent heat exchanger is the heart of the thermal swing absorption aspect of the system. The liquid-liquid heat exchanger is effective in transferring a significant amount of energy from the lean solution into the rich solution. In some embodiments, the solvent-to-solvent heat exchanger is configured such that it has a hot side approach temperature of less than about 15° C., for example, 5° C. to 10° C. Having such a close temperature differential between the inlet lean solvent and the outlet rich solvent temperatures indicates a significant retention of heat within the system, which improves overall operational efficiency.

In certain embodiments of the systems, the pressurized rich hot system solvent passes into exhaust gas to rich solvent heat exchanger 230. In FIG. 4, exhaust gas to rich solvent heat exchanger 230 is coupled to solvent-to-solvent heat exchanger 236 via heated rich solvent line 245. As previously described, the heat transferred by tailpipe exhaust feed superheats the pressurized rich hot system solvent, forming a superheated rich system solvent. The thermal energy passed from the exhaust gas is transferred into the rich solvent, which will be useful for driving out carbon dioxide from the rich system solvent in the solvent regenerator. The temperature difference between the inlet and outlet for the rich solvent is significant. For example, the inlet temperature of the pressurized rich hot system solvent may be about 10° C. less than the temperature of the regenerator (0° C. to 20° C.); the outlet temperature of the superheated rich system solvent may be in a range of from about 5° C. less to 20° C. greater than the regenerator temperature. Superheated rich system solvent passes from the exhaust gas to rich solvent heat exchanger 230 using superheated rich solvent feed line 247 toward solvent regenerator 220. Similar to stream 225 in the solvent regenerator reboiler loop, it may be desirable to limit a temperature of the solvent in stream 247 exiting the rich solvent heat exchanger 230, so as to prevent solvent degradation. A bypass loop around exchanger 230 may be provided to limit a maximum temperature of the solvent following contact with exhaust gas in exchanger 230, along with appropriate valving and controls (not illustrated).

The temperature of the superheated rich system solvent is greater than the operating temperature of the solvent regenerator. For example, in the exemplary embodiment, the temperature of the superheated rich system solvent may be about 10° C. greater than the regenerator temperature.

In some embodiments, the pressure of the superheated pressurized rich system solvent is greater than the operating pressure of the solvent regenerator. For example, in the exemplary embodiment, the pressure of the superheated rich system solvent may be about 4.3 bar when the pressure of the solvent regenerator may be about 2.1 bar. Another example, the pressure of the superheated rich system solvent may be about 6.2 bar when the pressure of the solvent regenerator may be about 2.4 bar. And, the pressure of the superheated rich system solvent may be about 7.2 bar when the pressure of the solvent regenerator may be about 2.7 bar.

The solvent regenerator not only receives energy from the reboiler loop, which extracts energy from the EGR, as previously described, but also energy is provided by the superheated lean system solvent, which extracts energy from both the lean system solvent and the exhaust gas feed. Both the superheated lean system solvent and the superheated rich system solvent passes into solvent regenerator 220. In the solvent system loop, the solvent regenerator 220 is coupled to and downstream of exhaust gas to rich solvent heat exchanger 230 and is upstream of solvent-to-solvent heat exchanger 236, repeating the solvent system loop. Solvent regenerator 220 is configured to remove at least in part some of the carbon dioxide from the rich system solvent. Amine regeneration and the release of carbon dioxide gas, which converts rich system solvent into lean system solvent, occurs due to the shift in chemical equilibrium at as a function of temperature. Species such as bicarbonate and carbamates, which form readily at low temperature, are unstable at high temperature releasing carbon dioxide from the solution.

In some embodiments, the solvent regenerator is configured to maximize surface area contact to facilitate regeneration of the lean system solvent and recovery of carbon dioxide gas. In some embodiments, the solvent regenerator may be configured similar to a traditional distillation column, such as with side-to-side alternating distillation trays, where rich system solvent flows downwards and released carbon dioxide gas flows upwards. Another configuration may be one where the column has random or structured packing, or sections of both, where the rich system solvent flows downwards converts into lean system solvent and released carbon dioxide gas flows upwards, each taking a torturous paths in their respective directions. Another configuration is where a series of spray nozzles mist or atomize the rich system solvent. Other variations and configurations are understood by one of skill in the distillation arts, and are envisioned as applicable to this disclosed subject matter. Regardless of the configuration, in the bottom of the solvent regenerator there is an amount of lean system solvent and proximate to the top there is a high concentration of carbon dioxide gas saturated with water.

As previously stated, the superheated lean system solvent and the superheated rich system solvent assist in the operation of the solvent regenerator. The superheated rich system solvent contains carbon dioxide reacted with the system solvent that is being recovered. Both streams are superheated to a temperature greater than the temperature of the solvent regenerator. This helps provide thermal drive for operating the solvent regenerator and reversing the solvent-$CO_2$ reaction to release carbon dioxide. Both streams are pressurized over the pressure for the solvent regenerator. This contributes to maintaining pressure in the solvent regenerator. Using the feed stream to capture heat and maintain pressure on the regenerator helps with making the systems more energy efficient.

In some embodiments, the inlet for the superheated rich system solvent into the solvent regenerator is positioned above the inlet for the superheated lean system solvent into the solvent regenerator. Because of the richness of the superheated rich system solvent, the superheated rich system solvent needs additional residence time and contact surface area to devolve from being a rich system solvent into a lean system solvent and to release the carbon dioxide from the system solvent. This is obtained by introducing the superheated rich system solvent higher up in the column and permitting the liquid system solvent to descend the column through one or more random or structured packing sections or via several distillation-like trays. For example, the inlet nozzle for the superheated rich system solvent may be positioned above a random or structured packing section configured for stripping and below a random or structured packing section configured for demisting.

The superheated lean system solvent, on the other hand, is introduced lower in the column. The function of the superheated lean system solvent is to provide supplemental energy to assist in driving the rich-to-lean conversion process of the rich system solvent. For example, the inlet nozzle for the superheated lean system solvent may be positioned below a random or structured packing section configured for stripping and above a liquid reservoir of lean system solvent.

In some embodiments, the inlet for the superheated rich system solvent into the solvent regenerator is configured with a high-pressure drop spray nozzle, such as an atomizing flow nozzle. The high-pressure drop spray nozzle serves several purposes for the operation of the solvent regenerator as well as the system. The high-pressure drop spray nozzle (or an effectively similar restriction) acts as a flow restriction in the solvent system loop for the rich solvent section (from the absorber system unit to the solvent regenerator). This permits the section between the solution system pump and the solvent regenerator to operate at a pressure greater than both the solvent regenerator and the saturation pressure of the rich system solvent. The elevated pressure of the rich system solvent facilitates superheating of the rich system solvent and prevent formation of vapor until the rich system solvent is introduced into the solvent regenerator. The high-pressure drop spray nozzle combined with the superheated rich system solvent create a flashing effect when introduced into the solvent regenerator. The sudden pressure drop across the nozzle upon entering the vessel facilitates the immediate conversion of much of the rich amine into lean amine and carbon dioxide gas. The flashing also permits the configuration of the solvent regenerator to have less packing or trays than if the system solvent was not superheated. A significant portion of the conversion from rich-to-lean solvent and the release of carbon dioxide occurs at or just after the tip of the nozzle in the solvent regenerator. Atomization of the system solvent into the void and packing spaces within the solvent regenerator immediately increases the liquid/gas contact area of the fluid versus if the introduced fluid was not atomized. The increased surface area facilitates not only heat transfer into the column but also the passing of carbon dioxide out of the fluid and into the vapor phase.

In some embodiments, the inlet for the superheated lean system solvent into the solvent regenerator is configured with a high-pressure drop spray nozzle, such as an atomizing flow nozzle. The same features and benefits previously described as passing though the high-pressure drop spray nozzle are similar for this stream. It should be noted that although the release of carbon dioxide is not as great from the superheated lean system solvent as from the rich system solvent stream, the superheated lean system solvent from the reboiler loop still releases additional carbon dioxide back into the solvent regenerator upon being introduced. The superheated lean system solvent more importantly introduces supplemental heat and pressure into the solvent regenerator, which supports its operation of converting the rich system solvent.

As previously described, the solvent regenerator passes lean system solvent that is hot from the bottom of the solvent regenerator to start the lean side of the solvent system loop. As well, a crude carbon dioxide vapor also passes out of the top of the solvent regenerator towards the carbon dioxide product pathway. In system 200, regenerator overhead line 251 is used to pass crude carbon dioxide vapor and steam from the solvent regenerator 220. In some embodiments, the temperature of the crude carbon dioxide vapor is around 115° C. and has a pressure in a range of from about 1.8 to about 2.7 bars. As noted previously, the temperature and pressure within the solvent regenerator, and thus the temperature and pressure of the crude carbon dioxide stream may vary, depending upon the solvent mixture used and other process variables. In some embodiments, the $CO_2$ concentration in the exhaust product is in a range of from about 20 to about 70 mol %, such as from about 25 to about 35 mole %; the balance is water. Other light gases that may have been absorbed may also be present to a minor extent.

The system includes a carbon dioxide product pathway. The carbon dioxide product pathway provides for receiving crude carbon dioxide vapor from the solvent regenerator and producing a concentrated pressurized carbon dioxide that can be selectively off-loaded from the vehicle. Along the pathway, the crude carbon dioxide is concentrated and purified by removing water from the carbon dioxide vapor.

The crude carbon dioxide vapor passes into the stripper vapor condenser 240. Stripper vapor condenser 240 is coupled to and downstream of solvent regenerator 220 using regenerator overhead line 251. Stripper vapor condenser 240 is an air-based cooler that extracts heat into the atmosphere such that the crude carbon dioxide vapor temperature is reduced to or less than about 40° C. In some configurations of stripper vapor condenser, the heat exchanger has exterior-fans that are activated upon an inlet temperature condition to pull air across the exposed tubes of the heat exchanger. In some other configurations, the heat exchanger has static heat fins that rely on ambient conditions to remove heat from the unit. Other static and active variations of the trim cooler are envisioned. Active variations may be powered as described above for trim coolers 232, 238.

Stripper vapor condenser 240 provides a vapor product and a liquid product. After cooling the saturated vapor, some of the water in the crude carbon dioxide vapor condenses into a liquid. The vapor product is a trimmed carbon dioxide that passes from stripper vapor condenser 240 using $CO_2$ compressor inlet line 253 into CO2 compressor 250. In exemplary embodiments, the temperature of the trimmed carbon dioxide may be about 40° C. and has a pressure in a range of from about 2.1 to about 2.7 bars. In some embodiments, the $CO_2$ concentration in the trimmed carbon dioxide is greater than 95 mole %, such as in a range of from about 96 to about 97 mole %; the balance is water. The liquid product is liquid water that passes from stripper vapor condenser 240 using first water condensate line 255 into water tank 254.

As shown in FIG. 4, $CO_2$ compressor 250 draws trimmed carbon dioxide from $CO_2$ compressor inlet line 253.

The trimmed carbon dioxide is compressed into a concentrated pressurized carbon dioxide that has a greater purity of carbon dioxide than the trimmed carbon dioxide. That is because as the carbon dioxide is compressed in the $CO_2$ compressor, the remaining water in the trimmed carbon dioxide condenses and drops out as liquid water. In some embodiments, concentrated pressurized carbon dioxide passing from the $CO_2$ compressor is pressurized from a pressure of about 2 to about 3 bar to a pressure at which the carbon dioxide may be at liquid-like densities at storage conditions, such as a pressure of 100 to 150 bar. Although reducing the pressure in the solvent regenerator would facilitate an improved carbon dioxide recovery from the rich system solvent, maintaining the pressure at a greater level comparatively reduces the power draw of the $CO_2$ compressor by not only reducing the amount of carbon dioxide to compress but also by reducing the compression ratio (outlet to inlet pressure) at which the compressor operates.

The $CO_2$ compressor operates in multiple stages with intercooling between each stage. This allows the temperature of the pressurized gas to be dropped before going on to the next stage, improving the efficiency of the compression process. It also allows the water to be condensed out after each stage using a heat exchanger and vessel to collect the water. Typically about 2 to 5 stages are sufficient to achieve reasonable efficiency; a typical number is 3 stages. Stages are typically designed such that the compression ratio in each stage is approximately equal. For example for a 3-stage compressor with 2.1 bar inlet pressure and final pressure of 100 bar, the outlet of the first stage would be about 7.6 bar, and the outlet of the second stage would be about 27.6 bar.

The outlet of the final $CO_2$ compression stage provides a super-critical $CO_2$ product containing a very small amount of water vapor. The super-critical $CO_2$ product is a concentrated pressurized carbon dioxide that passes from $CO_2$ compressor 250 using $CO_2$ compressor discharge line 257 into $CO_2$ onboard storage tank 252. In exemplary embodiments, the temperature of the concentrated pressurized carbon dioxide may be about 40° C. and has a pressure of about 100 to 150 bar. The final pressure depends on the trade-off between the storage space required and compression work available, which results in a minor parasitic load on the engine. In some embodiments, the $CO_2$ concentration in the concentrated pressurized carbon dioxide is greater than 99 mole %, such as about 99.97 mole %; the balance is water. The liquid product is liquid water that passes from the collection vessel or from a drain on the intercooler using second water condensate line 259 into water tank 254.

In some embodiments, the $CO_2$ compressor is coupled to the mobile vehicle or vessel to receive power. For example, the compressor may be coupled via a direct mechanical coupling, such as via a gear box to the turbo shaft. Direct mechanical coupling may also be provided via a gear box to the main engine shaft. Alternatively, hydraulic power may be provided via motor drive by hydraulic fluid pressurized by the engine shaft, or electric power may be provided via motor connected to the battery. The efficiencies and ease of integration vary for each of the possible embodiments, and may be selected based on available spacing, costs, efficiency desired, and other factors.

Optionally, in some embodiments, the $CO_2$ compressor is coupled to the turbo-compounder. For example, in system 200, turbo-compounding machine 510 of the mobile vehicle or vessel would be coupled to $CO_2$ compressor 250. In such a configuration, the $CO_2$ compressor may receive some or all of its power requirement from the energy extracted by the turbo-compounder. The coupling of the $CO_2$ compressor may be through means that provides energy in various forms, including, but not limited to, electrical, hydraulic, mechanical, or a combination thereof, means. Energy expended by turning of a turbo-compounder may be partially recovered, converted, stored, and transmitted through electrical systems (spinning of magnetic couplings), hydraulic systems (pumping and pressurization of hydraulic fluid), or mechanical systems (gear box) to facilitate the work performed by the $CO_2$ compressor. Such a configuration assists in recapturing expended energy from the engine, provides for some if not all of the power requirement of the $CO_2$ compressor, and prevents the $CO_2$ compressor from being parasitic to the power generation of the engine.

Optionally, in some embodiments, the $CO_2$ compressor is coupled to the crank shaft of the mobile vehicle or vessel. In such a configuration, the $CO_2$ compressor may receive some or all of its power requirement from the rotation of the crank shaft. The coupling of the $CO_2$ compressor may be through means that provides energy in various forms, including, but not limited to, electrical, hydraulic, mechanical, or a combination thereof, means. This relationship between the crank shaft of the mobile vehicle or vessel and the $CO_2$ compressor is similar in configuration and purpose as previously described for the crank shaft and the regenerator sump pump or the solvent system pump.

Optionally, in some embodiments, the $CO_2$ compressor is hydraulically powered and is coupled to the hydraulic power system of the mobile vehicle or vessel. In such a configuration, the $CO_2$ compressor may receive some or all of its power requirement from the hydraulic fluid power system. Similar to the other means, this potential link saves drawing energy directly from the power operation of the engine itself.

Optionally, in some embodiment, the $CO_2$ compressor is electrically driven and is coupled to the electrical system of the mobile vehicle or vessel. In an instance, the system may be configured such that the $CO_2$ compressor is coupled to the battery and draws direct power from the battery for operation. In another instance, a turbo-compounder or crank shaft direct electrical energy to an intermediary battery for storage, and the $CO_2$ compressor draws power from the intermediary battery for operation. In such configurations, the $CO_2$ compressor may receive some or all of its power requirement from the electrical power system. Similar to the other means, this potential link saves drawing energy directly from the power operation of the engine itself.

In some embodiments, the configuration of the system includes drawing power from a combination of power-generating sources on the mobile vehicle or vessel, such as, but not limited to, a turbo-compounder, a crank shaft, a hydraulic power system, and an electrical power system.

In some embodiments, the $CO_2$ onboard storage tank may be permanently mounted to the mobile vehicle or vessel and connected to the system. In some other embodiments, the $CO_2$ onboard storage tank may be detachable from the mobile vehicle or vessel and the system. In yet some other embodiments, a combination of permanent and detachable tanks may be used.

$CO_2$ storage tank is configured such that the concentrated pressurized carbon dioxide is received and stored within the tank for as long as the mobile vehicle or vessel is in motion and storage is needed. The $CO_2$ storage tank, such as $CO_2$ onboard storage tank 252 as shown for system 200 of FIG. 4, may be a permanent fixture as part of the mobile vehicle or vessel. In such instances, the concentrated pressurized carbon dioxide product may be off-loaded at an external facility to recover the concentrate pressurized carbon dioxide using a compressed product line, such as $CO_2$ product line 265 as shown for system 200 in FIG. 4.

$CO_2$ storage tank may also be configured as one or several cylinders, bullets, or containers, that may receive concentrated pressurized carbon dioxide, be detachable from the system, and be off-loaded from the system mobile vehicle or vessel. Such a system configuration provides convenience by permitting the removal and replacement of a tank that is partially or completely filled with concentrated pressurized carbon dioxide with an empty tank. Such detached tanks containing concentrated pressurized carbon dioxide may be stored indefinitely on the mobile vehicle or vessel, or until off-loaded at an external facility to recover the concentrate pressurized carbon dioxide.

The construction of the $CO_2$ storage tank may favor lighter-weight materials to reduce the overall weight of the system. Such materials may include alloys of steel, aluminum, or titanium; polymers; and composite materials, such as fiber glass and carbon fiber.

The concentrated pressurized carbon dioxide may be off-loaded during a period where the system is not operating. As well, it is envisioned that the concentrated pressurized carbon dioxide may be off-loaded while the system is operating. For example, by using more than one tank, it is feasible that carbon dioxide may be off-loaded while fresh concentrated pressurized carbon dioxide is recovered. For example, a detachable tank may be used to off-load a portion or all of the concentrated pressurized carbon dioxide that is stored in a permanently mounted tank. As well, a first permanent or detachable tank may be used to recover concentrated pressurized carbon dioxide as the system operates (the engine is operating and producing exhaust) while a second permanent or detachable tank is being off-loaded of concentrated pressurized carbon dioxide. It is envisioned that a person of ordinary skill in the art may also develop a procedure for safely and effectively off-loading a permanently mounted $CO_2$ storage tank while the system is producing concentrated pressurized carbon dioxide.

The system includes a water product pathway. Most of the elements have been previously described with the connection to the carbon dioxide product pathway. The water product pathway provides for receiving condensed water from the transformation of crude carbon dioxide vapor into concentrated pressurized carbon dioxide. It also provides for supplementing the solvent system loop with water to replenish the lean system solvent after losing some water as steam in the regenerator.

As shown in FIG. 4, a water pump 246 draws condensed water from water tank 254 using water draw line 261. Either periodically or continually, water is introduced using water pump 246 into the solvent system pump discharge line 243 at a tee using water injection line 263. Some water present in the exhaust gas may be absorbed; depending upon temperature and pressure conditions in the absorber, it is possible that some water may be lost from the system, evaporating and exiting with exhaust 207. Water may also exit the system, as noted above, with the carbon dioxide. Water balance can be managed in the system in the long-term by adjusting the temperature of the exhaust gas entering the absorber to either condense or evaporate water from the system.

Optionally, in some embodiments, the solvent system pump is coupled to the mobile vehicle or vessel to receive power. In such a configuration, the solvent system pump may receive some or all of its power requirement from the rotation of the crank shaft. The coupling of the solvent system pump may be through means that provides energy in various forms, including, but not limited to, electrical, hydraulic, mechanical, or a combination thereof, means. This relationship between the crank shaft of the mobile vehicle or vessel and the solvent system pump is similar in configuration and purpose as previously described for the crank shaft and the regenerator sump pump.

Supporting equipment for embodiments of the apparatus may include additional standard components or equipment that enables and makes operable the described apparatuses, processes, methods, systems, and compositions of matter. Examples of such standard equipment known to one of ordinary skill in the art includes but are not limited to heat exchanges, pumps, blowers, reboilers, steam generation, condensate handling, membranes, single and multi-stage compressors, separation and fractionation equipment, valves, switches, controllers and pressure-, temperature-, level- and flow-sensing devices.

Operation, control and performance of portions of or entire steps of a process or method can occur through human interaction, pre-programmed computer control and response systems, or combinations thereof. As described above, some values were provided for an exemplary embodiment to illustrate the mass flow, temperature and pressure relationships of the equipment and streams; depending upon the solvent mixture used, engine type, engine size, and other variables as noted above and recognizable to one skilled in the art, actual temperatures, pressures and flows for envisioned embodiments may vary. For example, a four cylinder engine may have significantly smaller flows as compared to an eight cylinder engine.

Figure 6:
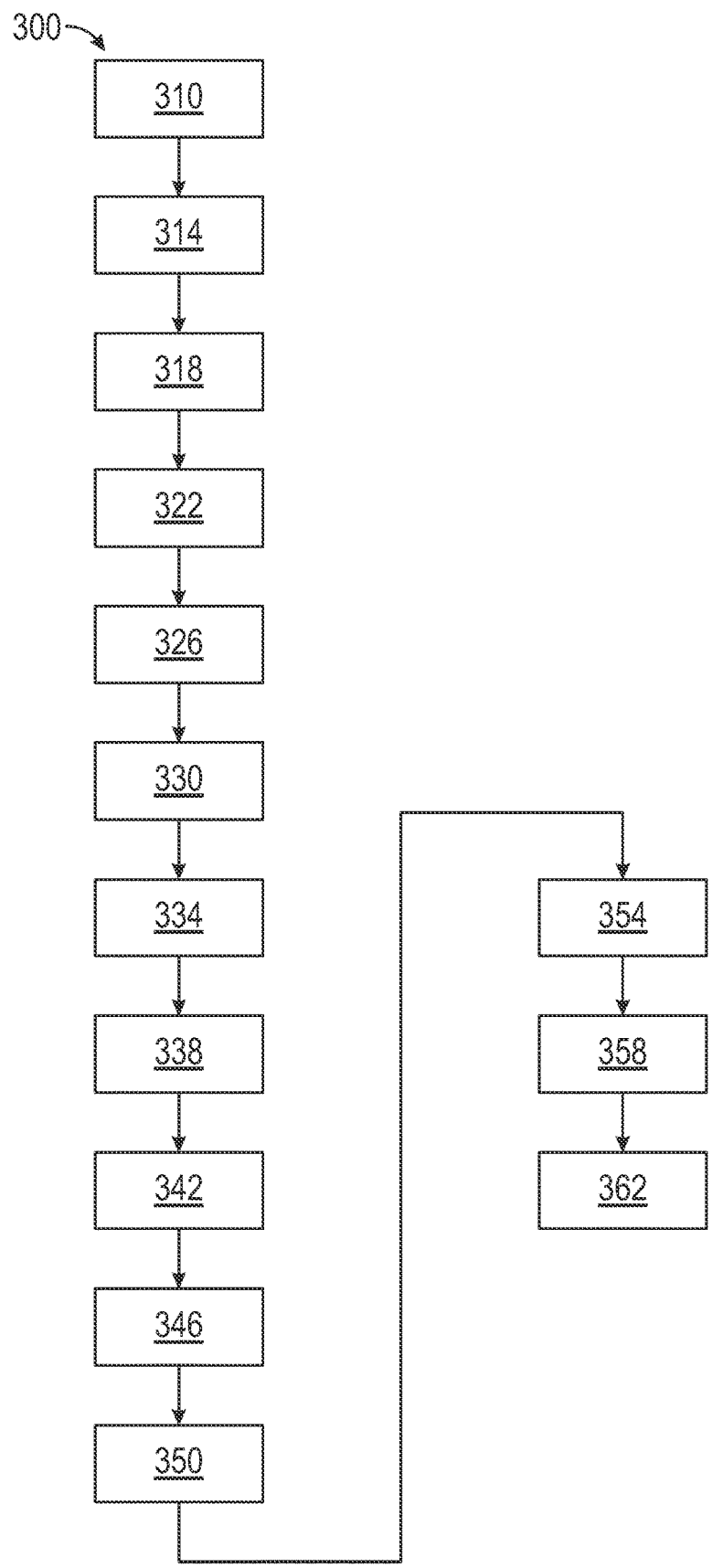
FIG. 6 shows a process of using an exhaust gas carbon dioxide capture and recovery system on a mobile vehicle or vessel, as provided in one or more embodiments.

FIG. 6 shows a process of using an exhaust gas carbon dioxide capture and recovery system mounted on a mobile vehicle or vessel.

In some embodiments of a process for using of the exhaust gas carbon dioxide capture and recovery system mounted on a mobile vehicle or vessel, a first exhaust feed and a second exhaust feed may be provided. In FIG. 6, the process includes providing a first and a second exhaust feed, in step 310. In some embodiments of the process, the source providing the first and the second exhaust feed may be a combustion engine that is permanently mounted on a mobile vehicle or vessel, such as one found on a diesel-operating Class 8 semi-truck. Other examples of vehicles and vessels with combustion engines have been previously describe, and their respective fuels, such as LPG, diesel, and marine heavy fuel, and their modes of operation, such as singularly, in parallel, in series, and in mixed type configurations (for example, gasoline-powered and diesel-powered engines acting with a common exhaust discharge for emissions tracking) are commonly understood and appreciated.

In some embodiments, a first exhaust feed and a second exhaust feed are provided from a common source. For example, the discharge of an engine without use of a turbo-compounder machine or an ATS may act as the introduction point for both the first exhaust feed and the second exhaust feed into the system. In some such embodiments, the properties and characteristics of the first exhaust feed and the second exhaust feed, such as temperature, pressure, and carbon dioxide concentration, may be substantially similar.

In some other embodiments, a first exhaust feed and a second exhaust feed are not provided from a common source. For example, the second exhaust feed may be discharged from a combustion engine; however, the first exhaust feed may be discharged from a turbo-compounding machine or an ATS coupled downstream of a combustion engine. In some such embodiments, the properties and characteristics of the first exhaust feed and the second exhaust feed, such as temperature, pressure, and carbon dioxide concentration, may be substantially different. For example, work may have been extracted from the first exhaust feed before it is introduced into the system, so the temperature or the pressure of the first exhaust feed may be reduced compared to the second exhaust feed. As well, the composition of the first exhaust feed may be different as remaining hydrocarbons may have been converted into carbon dioxide, thereby causing the carbon dioxide concentration in the first exhaust feed to be greater than the second exhaust feed.

In system 200 as previously described, the temperature of the first exhaust feed, which is provided from the ATS, is less than the temperature of the second exhaust feed, which is provided directly from the engine.

The flow of the system solvent, as previously described, is used to extract carbon dioxide from the first exhaust feed and recover crude carbon dioxide. In some embodiments, the flow of the system solvent may be initiated. In FIG. 6, a step 314 in the process includes initiating system solvent for the system. The fluid flows between the exhaust absorber system and the solvent regenerator, including the lean side and the rich side of the system solvent loop, may be started by activating a pump dedicated to the solvent system, such as solvent system pump 244. The system solvent is also used to extract energy from the EGR loop. The fluid flow in the lean system solvent regenerator reboiler loop, for example, may be started by a pump dedicated to the reboiler loop of the solvent regenerator, such as regenerator sump pump 242. Other pumps associated with the flow of solvent through systems herein may be used as one of ordinary skill in the art may envision.

In some embodiments, initiation of system solvent flow occurs before the first exhaust feed and the second exhaust feed are provided. Exhaust gas feeds are not available to be provide until at least one combustion engine is operational, so engaging the system solvent flow before initiating an engine startup sequence may be useful in attempting to capture carbon dioxide emissions during the engine startup. In some other embodiments, initiation of system solvent flow occurs simultaneously with providing the first exhaust feed and the second exhaust feed. In yet some other embodiments, initiation of system solvent flow occurs before the first exhaust gas and the second exhaust gas are introduced into the system. Such a process would permit the engine and its associated train of equipment, such as a turbo-compounding machine, to reach a pre-determined operational level before the first and the second exhaust feeds are introduced into the system. There may be operational requirements, such as backpressure on the exhaust system, that may not permit engagement of the system upon first starting a combustion engine. In yet some other embodiments, initiation of system solvent flow occurs after the first exhaust gas and the second exhaust gas are introduced into the system. This may be referred to as "blow through". Exhaust is permitted to discharge through the system before the solvent system loop is started. This may be required for operational reasons beyond the scope of this application. A person of ordinary skill in the art may envision situations and processes best served when the flow of the system solvent is initiated relative to the production of engine exhaust.

In embodiments, a first exhaust feed is introduced into the system. In FIG. 6, a step 318 in the process includes introducing the first exhaust feed into the system. For example, as previously described, a first exhaust feed for system 200—termed tailpipe exhaust feed—passes from ATS 520 and into exhaust gas to rich solvent heat exchanger 230 of the system 200.

In embodiments, a second exhaust feed is introduced into the system. FIG. 6, a step 322 in the process includes introducing the second exhaust feed into the system. For example, as previously described, a second exhaust feed for system 200—termed hot EGR feed—passed from engine 500 and into EGR to regenerator lean solvent heat exchanger 234 of the system 200.

In some embodiments, introduction of the first and the second exhaust feeds into the system occurs simultaneously. In some other embodiments, the introduction of the first and second exhaust feeds into the system occurs simultaneously with providing the first and the second exhaust feeds. In some circumstances, the operation of the system and a combustion engine may be coordinated to occur substantially at the same time.

In embodiments, the system is operated such that carbon dioxide is extracted from the first exhaust feed and absorbed into a lean system solvent using an exhaust absorber system. In FIG. 6, a step 326 in the process includes extracting carbon dioxide from a first exhaust feed. In doing so, the lean system solvent is converted into a rich system solvent as carbon dioxide reacts with the system solvent, and the first exhaust feed is converted into a first exhaust product as carbon dioxide is extracted. In system 200, the conversion of the lean system solvent and the first exhaust feed occurs in exhaust absorber system 210.

In embodiments, the system is operated such that heat is transferred from the lean system solvent into the rich system solvent using a solvent-to-solvent heat exchanger. In FIG. 6, step 330 includes transferring heat from the lean system solvent into the rich system solvent. In doing so, the rich system solvent is heated as it heads to the solvent regenerator, sending the heat recovered from the lean system solvent leaving the solvent regenerator back towards the solvent regenerator. In system 200, solvent-to-solvent heat exchanger 236 is used to effect recovery of the heat leaving the solvent regenerator 200.

In embodiments, the system is operated such that heat is transferred from the first exhaust feed into the rich system solvent using an exhaust gas to rich solvent heat exchanger. In FIG. 6, step 334 in the process includes transferring heat from the first exhaust feed into the rich system solvent. In doing so, the rich system solvent is superheated as it heads towards the solvent regenerator. Extracting waste heat from the first exhaust feed cools it as it heads towards the exhaust absorber system. Exhaust gas to rich solvent heat exchanger 230 is used to extract waste heat from the first exhaust feed to facilitate the operation of the solvent regenerator 220 in system 200.

In embodiments, the system is operated such that heat is transferred from the second exhaust feed into a lean system solvent using the EGR to regenerator lean solvent heat exchanger. In FIG. 6, step 338 includes transferring heat from the second exhaust feed into the lean system solvent. In doing so, a superheated lean system solvent forms and is returned towards the solvent regenerator. Extracting waste heat from the second exhaust feed causes it to cool. In system 200, EGR to regenerator lean solvent heat exchanger 230 is used to extract waste heat from the second exhaust feed to facilitate the operation of the solvent regenerator 220.

In embodiments, the system is operated such that carbon dioxide is desorbed from the superheated lean system solvent and the superheated rich system solvent. The carbon dioxide desorption for both occurs in a solvent regenerator. In FIG. 6, a step 342 in the process includes desorbing carbon dioxide from both the superheated lean system solvent and the superheated rich system solvent. From both, a crude carbon dioxide and the lean system solvent form. The crude carbon dioxide is directed towards a carbon dioxide compressor. The lean system solvent in the solvent regenerator is available for both carbon dioxide extraction by way of the lean side of the system solvent loop or heat recovery by way of the lean system solvent regenerator reboiler loop. Solvent regenerator 220 in system 200 provides for converting superheated rich system solution and superheated lean system solution into lean system solution and the crude carbon dioxide.

In embodiments, the system is operated such that the crude carbon dioxide is compressed using the carbon dioxide compressor. In FIG. 6, step 346 includes compressing the crude carbon dioxide. In doing so, a concentrated pressurized carbon dioxide product forms. The carbon dioxide concentration is a substantial portion of the concentrated pressurized carbon dioxide product. In system 200, $CO_2$ compressor 250 compresses the crude carbon dioxide vapor into the concentrated pressurized carbon dioxide product.

In embodiments, the system is operated such that the concentrated pressurized carbon dioxide product is passed into a carbon dioxide storage tank on-board the mobile vehicle or vessel. In FIG. 6, the process includes a step 350 of passing concentrated pressurized carbon dioxide into a carbon dioxide tank. In system 200, the concentrated pressurized carbon dioxide is stored in $CO_2$ onboard storage tank 252. As previously described, the carbon dioxide storage tank may be permanently, temporarily, or both, affixed or mounted on the mobile vehicle or vessel. The carbon dioxide storage tank may be a single or series of tanks.

In embodiments, first exhaust product passes from the system. In FIG. 6, a step 354 in the process includes passing the first exhaust product from the system. First exhaust product passes from the system via exhaust absorber system, such as exhaust absorber system 210 of system 200. In system 200, the first exhaust product is emitted using exhaust discharge line 207. The first exhaust product has both a reduced temperature and a reduced carbon dioxide concentration as compared to the first exhaust feed.

In embodiments, second exhaust product passes from the system. In FIG. 6, step 358 in the process includes passing the second exhaust product from the system. Second exhaust product passes from the system via the EGR loop. In system 200, the second exhaust stream passes from the system as cool EGR using second EGR line 213. The second exhaust product has a reduced temperature as compared to the second exhaust feed. In some such embodiments, the temperate of the second exhaust product is substantially cooler than the second exhaust feed.

In some embodiments, as the second exhaust product passes from the system, the second exhaust product is introduced to the combustion engine permanently mounted or affixed to the mobile vehicle or vessel.

In some embodiments, the concentrated pressurized carbon dioxide product passes from the mobile vehicle or vessel. In FIG. 6, a step 362 in the process includes passing the concentrated pressurized carbon dioxide from the mobile vehicle or vessel. For example, in system 200, concentrated pressurized carbon dioxide product may be off-loaded from the system on the semi-truck 100 using $CO_2$ product line 265. In other instances, temporary tanks, such as previously described, may be used to store and then remove concentrated pressurized carbon dioxide product. In some instances, such temporary tanks may be stored on the mobile vehicle or vessel for some period before they are removed.

In some such embodiments, the concentrated pressurized carbon dioxide product passes during operation of the system. In such instances, while the system may be operating, detachable tanks filled with previously-stored concentrated pressurized carbon dioxide product may be off-loaded. A dedicated line may off-load concentrated pressurized carbon dioxide from a first permanently-mounted carbon dioxide tank while a second permanently-mounted carbon dioxide tank receives fresh concentrated pressurized carbon dioxide from the operating system. Other variations where the system is operating and concentrated pressurized carbon dioxide product simultaneously are envisioned.

As described above with respect to FIGS. 2 and 2A, heat integration with exhaust and EGR can be carried out using heat exchangers to exchange heat between the exhaust gases and the solvent, such as in exchangers 230, 234, and 234A. In some embodiments, a secondary heat exchange fluid circuit may be provided on one or both of the EGR-to-solvent and exhaust-to-solvent heat recovery loops. In such embodiments, a heat exchange medium contacts the exhaust, heating the heat exchange medium and cooling the exhaust, and the heated heat exchange medium may be used to heat the solvent in a separate heat exchanger or reboiler. The intermediate heat transfer medium and the additional piping and exchangers required may add size, cost, and complexity to the system. However, such may also provide for better control and spatial distribution of the temperature in the solvent exchanger, avoiding potential hot spots and associated solvent degradation.

For example, a dedicated engine coolant loop may be used to cool EGR in a heat exchanger. This hot engine coolant is then passed through another heat exchanger and used to heat the solvent. This configuration adds complexity, but reduces the potential for exposing the solvent to hot metal temperature at the EGR inlet. In this embodiment, the hot engine coolant exiting the EGR to coolant exchanger may have a temperature of about 135° C. to 150° C., allowing sufficient driving force to heat the solvent without resulting in high metal temperature.

Similarly, embodiments herein may include a separate cooling circuit for rejecting heat at low temperature. A large aluminum heat exchanger may be used to exchange heat between cold heat exchange fluid and the environment, while the cold heat exchange fluid is used in a much smaller steel exchanger to cool the solvent in the solvent trim cooler 238, and/or to cool the exhaust in the exhaust gas trim cooler 232.

For example, a secondary coolant circuit may be used in the solvent trim cooler to reduce the solvent temperature, such as from about 45° C.-50° C. to about 40° C. In this configuration, the heat exchange fluid used in the circuit enters the solvent to cold heat exchange fluid exchanger at about 25° C.-35° C. Heat is rejected from the cold heat exchange fluid to ambient using a heat exchange fluid to air heat exchanger. The advantage of this configuration is that it allows the larger heat exchange fluid to air exchanger to be made out of aluminum, reducing the size and cost of this unit, while the much smaller solvent to heat exchange fluid exchanger is made out of carbon steel or other solvent-compatible material.

While the above-described intermediate cooling circuits are not illustrated, such may be readily envisioned by one skilled in the art based on the above descriptions and their relation to FIG. 3A. Further, while described above with respect to EGR exhaust gas being used to reboil the solvent regenerator, EGR exhaust gas may alternatively be used to heat the rich solvent while the exhaust gas upstream of the absorber system may be used to provide heat for reboil.

As described above, embodiments herein may provide for the efficient capture of $CO_2$ from an engine. Exemplary embodiments described target a 40% capture rate for a semi engine at cruising conditions under full load. The particular types of exchangers, pumps, membranes, solvents, and sizes of vessels, pumps, compressors, etc., may vary depending upon the specific engine type as well as the target capture rate.

Control systems associated with embodiments herein may be configured to control various portions of the process, including temperatures, flow rates, pressures, levels, and other variables associated with the various unit operations. For example, a control system may be configured for one or more of maintaining a water content of the lean solvent, controlling a temperature or a pressure of the regenerator, maintaining a flow rate of the rich system solvent, or controlling a temperature or a pressure of the rich system solvent or the lean system solvent. A liquid rate in the EGR circuit and pressure of the stripper may be controlled, for example, to adjust heat rejection. A flow control system, including associated valving and piping, may be provided to bypass all or part of the exhaust around the reboiler or around the exhaust gas to rich solvent heat exchanger. The control system may alter process conditions, such as increasing lean solvent flow rate through the EGR cooler, reduce stripper pressure, bypass part or all of the exhaust from the exhaust to rich solvent exchanger, or bypass EGR to a secondary EGR cooler, if included, that is cooled with engine coolant. The control system may be configured to operate under one set of operating conditions or ranges under cruising conditions, while configured to operate under another set of operating conditions or ranges under low load or high load conditions.

Embodiments of the system may also include a control system configured for one or more of maintaining a water content of the lean solvent, maintaining a flow rate of the lean solvent, controlling a temperature or pressure of the regenerator, controlling a temperature of the exhaust gas, or controlling a temperature or pressure of the rich solvent or the lean solvent. Control strategies contemplated include varying a flow rate of the solvent or heat source through a heat exchanger, and/or varying a flow rate of solvent or heat source through a bypass around a heat exchanger, or around a gas liquid contactor. In some embodiments, the control system is configured for one or more of: maintaining exhaust backpressure on the internal combustion engine below a certain limit; maintaining a temperature of the first exhaust feed entering the exhaust absorber system below a certain limit; maintaining a water content of the lean solvent stream; maintaining a flow rate of the lean solvent stream, controlling a temperature or a pressure of the solvent regenerator; or, controlling a temperature of the rich solvent stream or the lean solvent stream. In various embodiments, the control system is configured to activate a bypass valve to direct exhaust flow around the exhaust absorber system when an exhaust temperature limit or an exhaust backpressure limit is exceeded. For example, the temperature limit may be around 40-60° C. and the exhaust backpressure limit at the outlet of the exhaust absorber system may be 5-30 kPa gauge. In some embodiments, the control system is configured to increase a flow rate of rich solvent or lean solvent through a heat exchanger to reduce a temperature of the rich solvent or the lean solvent, or wherein the control system is configured to reduce a flow rate of a heat source fluid through a heat exchanger to reduce the temperature of the rich solvent or the lean solvent. In some embodiments, the control system is configured to adjust a position of a pressure regulator to control a pressure of the solvent regenerator and lean solvent loading, or to reduce a temperature of the solvent regenerator. In yet other embodiments, the system may further include an instrument to measure a solvent viscosity, and the control system is configured to control an amount of water returned to the system based on the measured solvent viscosity.

Methods herein may include execution of the control strategies noted above. For example, a bypass valve may be actuated to direct exhaust flow around the absorber when an exhaust temperature limit or exhaust backpressure limit is exceeded. Methods may further include increasing or decreasing solvent or heat source fluid flow rates to decrease or increase a temperature of the solvent. Methods may also include adjusting a pressure of the solvent regenerator and/or measuring a solvent viscosity and adjusting a flow rate of water returned to the system. Other method steps may be readily recognized as disclosed herein based upon other control strategies provided above.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" and similar terms refers to a subsequently described event or circumstance that may or may not occur. The description includes instances where the event or circumstance occurs and instances where it does not occur.

"Substantially" and similar terms refers to a majority of, or mostly, as in at least about 50%, 60%, 70%, 80%, 90%, 95%, 96%, 97%, 98%, 99%, 99.5%, 99.9%, 99.99%, or at least about 99.999% or more.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. An exhaust gas carbon dioxide capture and recovery system for an internal combustion engine, the system comprising:
    an exhaust absorber system configured to extract at least a portion of carbon dioxide from a first exhaust feed using a lean solvent stream comprising a solvent selective for absorbing carbon dioxide and to produce a first exhaust product having a reduced amount of carbon dioxide and a rich solvent stream comprising solvent and absorbed carbon dioxide;
    a solvent regenerator configured to convert the rich solvent stream into the lean solvent stream and a crude carbon dioxide vapor using at least two heat sources, where the solvent regenerator is coupled to the exhaust absorber system using a system solvent loop such that the solvent regenerator is downstream of the exhaust absorber system for receiving the rich solvent stream and upstream of the exhaust absorber system for providing the lean solvent stream, wherein the solvent regenerator operates at a temperature of above 100° C., and where the at least two heat sources comprise two or more of the following: (1) an engine exhaust going to a tailpipe of the internal combustion engine; (2) an engine exhaust being recirculated to the internal combustion engine; (3) an engine coolant; or (4) an engine lubrication oil;
    a carbon dioxide compressor configured to convert the crude carbon dioxide vapor into a concentrated pressurized carbon dioxide product, where the carbon dioxide compressor is coupled downstream of the solvent regenerator along a carbon dioxide gas flow path;
    a carbon dioxide storage tank configured to both receive and store the concentrated pressurized carbon dioxide product, where the carbon dioxide storage tank is coupled downstream of the carbon dioxide compressor along the carbon dioxide gas flow path;
    where the system is mounted on a mobile vehicle or vessel or receives exhaust gas from an internal combustion engine.

2. The system of claim 1, comprising a heat exchanger configured to exchange heat between the lean solvent being fed from the solvent regenerator to the exhaust absorber system and the rich solvent being fed from the exhaust absorber system to the solvent regenerator.

3. The system of claim 2, comprising two or more heat exchangers associated with the solvent regenerator and configured to transfer heat from the at least two heat sources into the solvent.

4. The system of claim 3, wherein a first of the two or more heat exchangers is configured to exchange heat between solvent and engine exhaust going to a tailpipe and a second of the two or more heat exchangers is configured to exchange heat between solvent and engine exhaust being recirculated to an intake of the internal combustion engine.

5. The system of claim 3, further comprising a backpressure device and a pump, wherein at least one of the two or more heat exchangers, in conjunction with a respective backpressure device and pump, is configured to heat and pressurize the solvent above an operating pressure of the stripper, forming a superheated solvent.

6. The system of claim 5, wherein the backpressure device comprises a spray nozzle.

7. The system of claim 6, further comprising a lean solvent heat exchanger configured to reduce a temperature of the lean solvent, wherein the lean solvent heat exchanger is coupled downstream of the solvent-to-solvent heat exchanger and upstream of the exhaust absorber system with respect to the lean solvent flow.

8. The system of claim 5, wherein the solvent regenerator comprises a stripper column containing packing material configured to facilitate mass transfer between gas and liquid phases, and wherein the stripper is configured to receive the rich solvent in an upper portion of the column and to receive solvent from the two or more heat exchangers in a lower portion of the column.

9. The system of claim 1, further comprising a control system configured to maintain a temperature of the solvent below a set point temperature sufficient to limit solvent degradation.

10. The system of claim 1, wherein the internal combustion engine is configured to operate with an engine coolant or engine lubricant having a temperature of at least 120° C.

11. The system of claim 1, further comprising an exhaust gas to rich solvent heat exchanger configured to receive the first exhaust feed, transfer heat from the first exhaust feed into the rich solvent stream, and pass the first exhaust feed to the exhaust absorber system along an exhaust gas flow path, where the exhaust gas to rich solvent heat exchanger is coupled upstream of the exhaust absorber system along the exhaust gas flow path, upstream of the solvent regenerator and downstream of the exhaust absorber system.

12. The system of claim 11, further comprising an exhaust gas heat exchanger configured to reduce a temperature of the first exhaust feed, wherein the exhaust gas heat exchanger is coupled downstream of the exhaust gas to rich solvent feed and upstream of the exhaust absorber system along the exhaust gas flow path.

13. The system of claim 1, further comprising a secondary heat transfer loop containing a fluid which is thermally stable to exhaust temperatures and configured to extract heat from a high temperature heat source using a first heat exchange device, and then to transfer the extracted heat from the fluid to the solvent using a second heat exchange device or boiler.

14. The system of claim 13, wherein the first heat exchange device comprises an exhaust gas to heat exchange fluid heat exchanger and wherein the second heat exchange device comprises a heat exchange fluid to rich solvent heat exchanger, wherein:
    the exhaust gas to heat exchange fluid heat exchanger is configured to receive the first exhaust feed, transfer heat from the first exhaust feed into the fluid, and pass the first exhaust feed to the exhaust absorber system along an exhaust gas flow path;
    the heat exchange fluid to rich solvent heat exchanger is configured to receive heated fluid from the exhaust gas to heat exchange fluid heat exchanger, indirectly heat the rich solvent, and pass heated rich solvent to the solvent regenerator;

the exhaust gas to heat exchange fluid heat exchanger and heat exchange fluid to rich solvent heat exchanger are respectively coupled upstream of the exhaust absorber system along the exhaust gas flow path, and upstream of the solvent regenerator and downstream of the exhaust absorber system.

15. The system of claim 14, further comprising an exhaust gas heat exchanger configured to reduce a temperature of the first exhaust feed, wherein the exhaust gas heat exchanger is coupled downstream of the exhaust gas to heat exchange fluid heat exchanger and upstream of the exhaust absorber system along the exhaust gas flow path.

16. The system of claim 1 further comprising a solvent-to-solvent heat exchanger configured to transfer heat from the lean solvent into the rich solvent, where the solvent-to-solvent heat exchanger is coupled downstream of the exhaust absorber system and upstream of the solvent regenerator with respect to rich solvent flow, and is coupled downstream of the solvent regenerator and upstream of the exhaust absorber system with respect to lean solvent flow.

17. The system of claim 1 further comprising an exhaust to regenerator lean solvent heat exchanger configured to receive a second exhaust feed and to pass a second exhaust product, and to transfer heat from the exhaust into a second lean solvent stream.

18. The system of claim 1, further comprising an exhaust to heat exchange medium heat exchanger and a heat exchange medium to regenerator lean solvent heat exchanger, configured to receive a second exhaust feed and to pass a second exhaust product, and to transfer heat from the exhaust via the heat exchange medium into a second lean solvent stream.

19. The system of claim 1, further comprising a bypass system configured for diverting exhaust around the exhaust absorber system.

20. The system of claim 1, further comprising a control system configured for one or more of: maintaining exhaust backpressure on the internal combustion engine below a certain limit; maintaining a temperature of the first exhaust feed entering the exhaust absorber system below a certain limit; maintaining a water content of the lean solvent stream; maintaining a flow rate of the lean solvent stream, controlling a temperature or a pressure of the solvent regenerator; or, controlling a temperature of the rich solvent stream or the lean solvent stream.

21. The system of claim 20, wherein the control system is configured to activate a bypass valve to direct exhaust flow around the exhaust absorber system when an exhaust temperature limit or an exhaust backpressure limit is exceeded.

22. The system of claim 20, wherein the control system is configured to increase a flow rate of rich solvent or lean solvent through a heat exchanger to reduce a temperature of the rich solvent or the lean solvent, or wherein the control system is configured to reduce a flow rate of a heat source fluid through a heat exchanger to reduce the temperature of the rich solvent or the lean solvent.

23. The system of claim 20, wherein the control system is configured to adjust a position of a pressure regulator to control a pressure of the solvent regenerator and lean solvent loading, or to reduce a temperature of the solvent regenerator.

24. The system of claim 20, further comprising an instrument to measure a solvent viscosity, and wherein the control system is configured to control an amount of water returned to the system based on the measured solvent viscosity.

25. A process for reducing carbon dioxide emissions from an internal combustion engine, the process comprising:
   in an exhaust absorber system, extracting at least a portion of carbon dioxide from a first exhaust feed using a lean CO2-selective system solvent and to pass a first exhaust product and a rich system solvent a solvent stream with increased CO2 concentration, wherein the exhaust absorber system operates at a temperature of less than 80° C.;
   in a solvent regenerator, converting the rich system solvent into the lean CO2-selective system solvent and a crude carbon dioxide vapor using at least two heat sources, where the solvent regenerator is coupled to the exhaust absorber system using a system solvent loop such that the solvent regenerator is downstream of the exhaust absorber system on a rich side of the system solvent loop and upstream of the exhaust absorber system on a lean side of the system solvent loop, and wherein the solvent regenerator operates at a temperature of greater than 100° C., and where the at least two heat sources comprise two or more of the following: (1) an engine exhaust going to a tailpipe of the internal combustion engine; (2) an engine exhaust being recirculated to the internal combustion engine; (3) an engine coolant; or (4) an engine lubrication oil;
   exchanging heat between the lean solvent leaving the solvent regenerator and the rich solvent leaving the absorber system;
   regenerating the solvent by transferring heat from two or more heat sources into the solvent, thereby raising a temperature and pressure of the solvent, and releasing CO2 from the solvent;
   converting the crude carbon dioxide vapor into a concentrated pressurized carbon dioxide product using a carbon dioxide compressor, wherein the carbon dioxide compressor is coupled downstream of the solvent regenerator along a carbon dioxide gas flow path;
   storing the pressurized carbon dioxide product in a carbon dioxide storage tank.

26. The process of claim 25, further comprising supplying energy to the carbon dioxide compressor via one or more of a mechanical coupling to the engine crank shaft, a shaft of a turbo compounding device that generates mechanical work from exhaust pressure, a hydraulic motor, or an electrical motor powered by a battery of the internal combustion engine.

27. The process of claim 25, further comprising reducing a temperature of the exhaust to less than 80° C. upstream of the exhaust absorber system.

28. The process of claim 25, further comprising reducing a temperature of the solvent to less than 80° C. upstream of the exhaust absorber system.

29. The process of claim 28, wherein the reducing a temperature of the solvent comprises transferring heat from the solvent to a liquid heat transfer fluid and subsequently transferring heat from the liquid heat transfer fluid to the environment.

* * * * *